United States Patent
Liu et al.

(10) Patent No.: US 9,992,619 B2
(45) Date of Patent: Jun. 5, 2018

(54) NETWORK DEVICE BASED PROXIMITY BEACON LOCATING

(71) Applicant: Aerohive Networks, Inc., Milpitas, CA (US)

(72) Inventors: Changming Liu, Cupertino, CA (US); William Hoppin, Mill Valley, CA (US); Chris Scheers, Palo Alto, CA (US)

(73) Assignee: Aerohive Networks, Inc., Milpitas, CA (US)

(*) Notice: Subject to any disclaimer, the term of this patent is extended or adjusted under 35 U.S.C. 154(b) by 134 days.

(21) Appl. No.: 14/465,734

(22) Filed: Aug. 21, 2014

(65) Prior Publication Data
US 2016/0050526 A1 Feb. 18, 2016

Related U.S. Application Data

(60) Provisional application No. 62/036,486, filed on Aug. 12, 2014.

(51) Int. Cl.
*H04W 4/02* (2018.01)
*H04W 4/00* (2018.01)
*H04W 24/10* (2009.01)

(52) U.S. Cl.
CPC ........... *H04W 4/021* (2013.01); *H04W 4/005* (2013.01); *H04W 4/008* (2013.01); *H04W 24/10* (2013.01)

(58) Field of Classification Search
CPC ....... H04W 4/02; H04W 4/021; H04W 4/023; H04W 4/027; H04W 4/04; H04W 4/043;
(Continued)

(56) References Cited

U.S. PATENT DOCUMENTS 5,845,091 A 12/1998 Dunne et al.
6,006,018 A 12/1999 Burnett et al.
(Continued)

FOREIGN PATENT DOCUMENTS

CN 102055769 5/2011

OTHER PUBLICATIONS

Long, M. et al., "Localised Authentication for Inter-Network Roaming Across Wireless LANs," IEE Proceedings—Communications, vol. 151, No. 5, pp. 496-500, Oct. 24, 2004.
(Continued)

*Primary Examiner* — Michael Mapa
(74) *Attorney, Agent, or Firm* — Sheppard, Mullin, Richter & Hampton LLP

(57) ABSTRACT

A proximity beacon signal transmitted by a network device-coupled proximity beacon transmitter is received at a network device. A RSSI reporting message is generated at the network device based on the proximity beacon signal. A position of the network device-coupled proximity beacon transmitter with respect to the network device is determined using the RSSI reporting message. A location of the network device within a region is determined using the RSSI reporting message and network device map data for the region. The location of the network device-coupled proximity beacon transmitter in the region is determined based on the position of the network device-coupled proximity beacon transmitter with respect to the network device and the location of the network device within the region.

15 Claims, 11 Drawing Sheets

(58) Field of Classification Search
CPC ..... H04W 4/005; H04W 4/008; H04W 24/10; H04W 64/00; G01S 5/00; G01S 5/02; G01S 5/0252; G01S 5/0278; G01S 5/0284; G01S 5/0294; G01S 5/14
USPC .......... 455/404.2, 414.2, 456.1–457
See application file for complete search history.

(56) References Cited

U.S. PATENT DOCUMENTS

| | | | |
|---|---|---|---|
| 6,243,581 B1 | 6/2001 | Jawanda | |
| 6,243,758 B1 | 6/2001 | Okanoue | |
| 6,751,677 B1 | 6/2004 | Ilnicki et al. | |
| 6,847,609 B1 | 1/2005 | Sarnikowski et al. | |
| 6,976,087 B1 | 12/2005 | Westfall et al. | |
| 7,032,022 B1 | 4/2006 | Shanumgam et al. | |
| 7,506,054 B1 | 3/2009 | Fuh et al. | |
| 7,774,828 B2 | 8/2010 | Benenati et al. | |
| 7,974,234 B2 | 7/2011 | Gustave et al. | |
| 8,064,583 B1 | 11/2011 | Sutaria et al. | |
| 8,151,323 B2 | 4/2012 | Harris et al. | |
| 8,428,601 B2 | 4/2013 | Samar et al. | |
| 8,745,716 B2 | 6/2014 | Brudnicki et al. | |
| 2001/0044309 A1* | 11/2001 | Bar .................. | G01C 21/26 455/456.5 |
| 2002/0069117 A1 | 6/2002 | Carothers et al. | |
| 2002/0099666 A1 | 7/2002 | Dryer et al. | |
| 2002/0138632 A1 | 9/2002 | Bade et al. | |
| 2003/0055818 A1 | 3/2003 | Faybishenko et al. | |
| 2003/0061388 A1 | 3/2003 | Cleghorn et al. | |
| 2003/0220116 A1* | 11/2003 | Sagefalk ............... | H04W 64/00 455/456.1 |
| 2004/0093340 A1 | 5/2004 | Edmondson et al. | |
| 2004/0100983 A1 | 5/2004 | Suzuki | |
| 2004/0166874 A1 | 8/2004 | Asokan et al. | |
| 2004/0196858 A1 | 10/2004 | Tsai et al. | |
| 2005/0010692 A1 | 1/2005 | Jain et al. | |
| 2005/0022006 A1 | 1/2005 | Bass et al. | |
| 2005/0066200 A1 | 3/2005 | Bahl et al. | |
| 2005/0138204 A1 | 6/2005 | Iyer et al. | |
| 2005/0141465 A1* | 6/2005 | Kato .................. | H04W 40/00 370/337 |
| 2006/0037071 A1 | 2/2006 | Rao et al. | |
| 2006/0075472 A1 | 4/2006 | Sanda et al. | |
| 2007/0156670 A1 | 7/2007 | Lim | |
| 2007/0208744 A1 | 9/2007 | Krishnaprasad et al. | |
| 2008/0034401 A1 | 2/2008 | Wang | |
| 2008/0098212 A1 | 4/2008 | Helms et al. | |
| 2008/0186896 A1 | 8/2008 | Fanfelle et al. | |
| 2008/0307523 A1 | 12/2008 | Subramanyam et al. | |
| 2008/0316104 A1* | 12/2008 | Seong .................. | G01S 5/10 342/442 |
| 2009/0058653 A1* | 3/2009 | Geissler ............. | G08B 13/2462 340/572.1 |
| 2009/0172789 A1 | 7/2009 | Band et al. | |
| 2010/0024008 A1 | 1/2010 | Hopen et al. | |
| 2010/0074418 A1 | 3/2010 | Poremba | |
| 2010/0250735 A1* | 9/2010 | Andersen ............... | G06Q 10/10 709/224 |
| 2010/0277309 A1* | 11/2010 | Anderson ............. | A61B 5/1113 340/539.13 |
| 2011/0093434 A1 | 4/2011 | Arora et al. | |
| 2011/0093919 A1 | 4/2011 | Naslund et al. | |
| 2011/0283104 A1 | 11/2011 | Sangubhatla | |
| 2012/0198064 A1 | 8/2012 | Boutros et al. | |
| 2012/0226814 A1 | 9/2012 | Stucker | |
| 2012/0264402 A1 | 10/2012 | Zhang et al. | |
| 2013/0007239 A1 | 1/2013 | Agarwal et al. | |
| 2013/0136123 A1 | 5/2013 | Ge et al. | |
| 2013/0185446 A1 | 7/2013 | Zeng et al. | |
| 2013/0225199 A1* | 8/2013 | Shaw .................... | H04W 24/00 455/456.1 |
| 2014/0095525 A1 | 4/2014 | Hsiao et al. | |
| 2014/0127992 A1* | 5/2014 | Kuscher ............... | H04B 5/0031 455/41.1 |
| 2015/0126213 A1* | 5/2015 | Fayssal ................... | H04W 4/04 455/456.1 |
| 2015/0341765 A1* | 11/2015 | Macias .................. | H04W 4/22 455/404.2 |
| 2016/0014025 A1 | 1/2016 | Wang | |
| 2016/0183037 A1* | 6/2016 | Grohman ............. | H04W 4/008 709/221 |

OTHER PUBLICATIONS

Seggelmann, R. et al., "Transport Layer Security (TLS) and Datagram Transport Layer Security (DTLS) Heartbeat Extension," Request for Comments (RFC) 6520, ISSN 2070-1721, Feb. 2012.
Winter, S. et al., "Transport Layer Security (TLS) Encryption for RADIUS," Request for Comments (RFC) 6614, ISSN 2070-1721, May 2012.
International Application No. PCT/US2013/057692, International Search Report and Written Opinion dated May 1, 2014.
European Patent Application No. 13832735.8, Search Report dated Aug. 1, 2016.
Bolla, R. et al., "A Distributed Routing and Access Control Scheme for ATM Networks," IEEE International Conference on Communications, vol. 1, pp. 44-50, May 1994.
European Patent Application No. C15926EP2, Search Report dated Mar. 7, 2017.
Deng, Yueming et al., "Trust-Based Fast Inter-Domain Secure Handoff over Heterogeneous Wireless Networks," 7th International Conference on Wireless Communications, Networking and Mobile Computing (WiCOM), pp. 1-5, Oct. 2011.
Wan, Changsheng et al., "A Message Source Authentication Scheme for Inter-Domain Routing Protocols," 6th International Conference on Networked Computing, pp. 1-4, May 11, 2010.

* cited by examiner

NETWORK DEVICE BASED PROXIMITY BEACON LOCATING

CROSS-REFERENCE TO RELATED APPLICATION

This application claims the benefit of U.S. Application No. 62/036,486 entitled "NETWORK DEVICE BASED PROXIMITY BEACON LOCATING," filed Aug. 12, 2014, which is incorporated herein by reference.

BACKGROUND

An area of ongoing research and development is in improving performance of communication over a network, and in particular a wireless network. Recently low-power advertising devices, also known as proximity beacons, have been created to further expand the potentials of wireless networks. Such low-power advertising devices typically establish wireless connections with other devices in accordance with low power wireless communication protocols. As proximity beacons become more prevalent in wireless networks, there exist needs for effectively locating proximity beacons. In particular there exist needs for effectively locating proximity beacons when the proximity beacons are used as ways for tracking movement and operational statuses of equipment, in particular portable equipment.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for network device based proximity beacon locating. In various implementations, a proximity beacon signal transmitted by a network device-coupled proximity beacon transmitter is received at a network device. Further, in various implementations, a RSSI reporting message is generated at the network device based on the proximity beacon signal. In various implementations, a position of the network device-coupled proximity beacon transmitter with respect to the network device is determined using the RSSI reporting message. Additionally, in various implementations, a location of the network device within a region is determined using the RSSI reporting message and network device map data for the region. In various implementations, the location of the network device-coupled proximity beacon transmitter in the region is determined based on the position of the network device-coupled proximity beacon transmitter with respect to the network device and the location of the network device within the region.

These and other advantages will become apparent to those skilled in the relevant art upon a reading of the following descriptions and a study of the several examples of the drawings.

DETAILED DESCRIPTION

Figure 1:
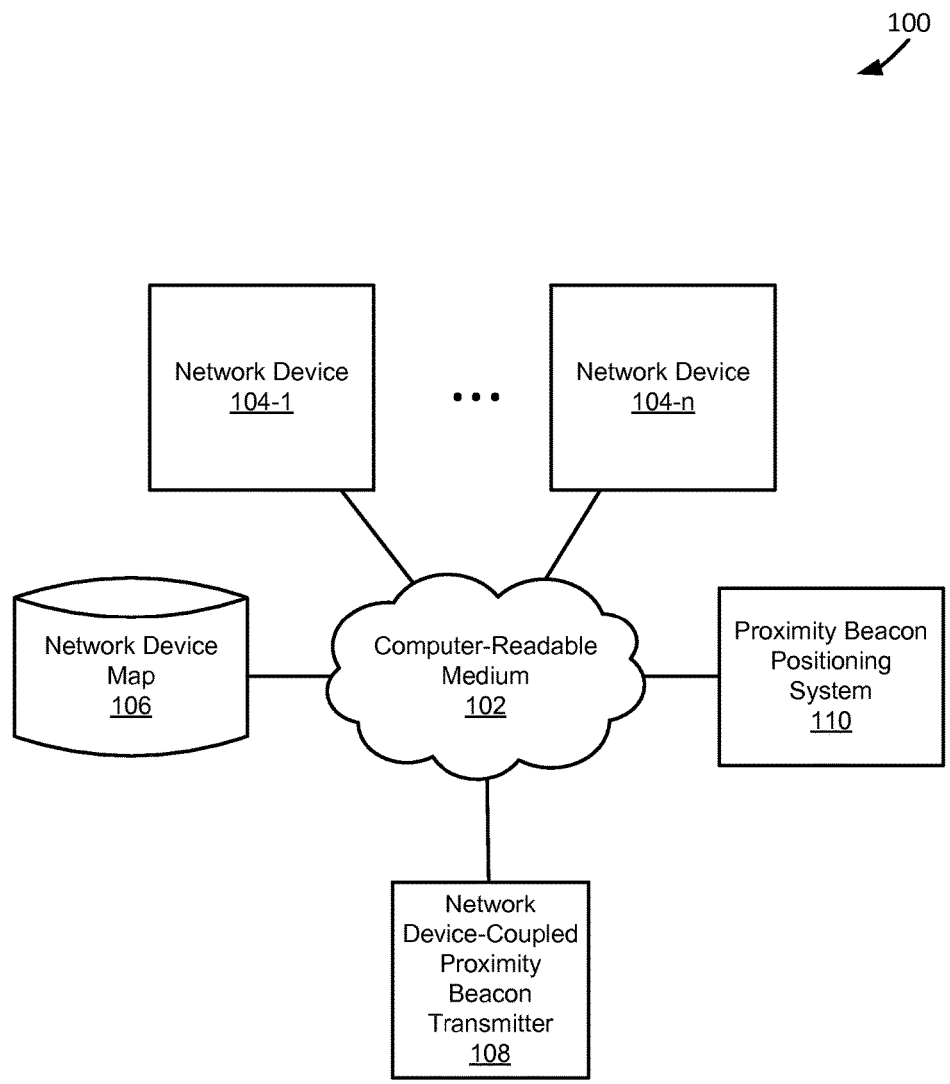
FIG. 1 depicts a diagram of an example of a system for network device-based position determination of network device-coupled proximity beacon transmitters.

FIG. 1 depicts a diagram 100 of an example of a system for network device-based position determination of network device-coupled proximity beacon transmitters. The example system shown in FIG. 1 includes a computer-readable medium 102, network devices 104-1 . . . 104-n (hereinafter referred to as "network devices 104"), a network device map datastore 106, a network device-coupled proximity beacon transmitter (hereinafter referred to as "PBT") 108, and a proximity beacon positioning system 110.

In the example system shown in FIG. 1, the network devices 104, the network device map datastore 106, the network device-coupled PBT 108, and the proximity beacon positioning system 110 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a network.

Assuming the computer-readable medium 102 includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a computer-readable medium 102 that may or may not include more than one private network.

In a specific implementation, at least a portion of a computer-readable medium as used in this paper, such as the computer-readable medium 102, forms part of a network created in accordance with an applicable lower power short range wireless communication protocol, such as Bluetooth® or ZigBee®. For example, the computer-readable medium 102 can include systems and/or devices coupled to each other through a Bluetooth Connection®. Depending upon implementation-specific or other considerations, the network device-coupled PBT 108 is coupled to the network devices 104 through an applicable lower power short range wireless communication protocol.

The computer-readable medium 102, the network devices 104, the network device-coupled PBT 108, the proximity beacon positioning system 110, and other systems, or devices described in this paper can be implemented as a computer system or parts of a computer system or a plurality of computer systems. A computer system, as used in this paper, can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific, configuration-specific, or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the network devices 104 function according to applicable devices for routing, at least in part, data traffic to and from a backend of a network. Depending upon implementation-specific or other considerations, the network devices 104 can be routers, switches, access points, gateways, including wireless gateways, repeaters, or any combinations thereof. In functioning as gateways, the network devices 104 can transport data from a backend of a network to a device coupled to the network devices 104. In functioning as access points, the network devices 104 can couple a device coupled to the network devices 104 to a network associated with the network devices 104. The network devices 104 can function according to applicable protocols for forming part of a wireless network, including WiFi, such as the IEEE 802.11 standards, which are hereby incorporated by reference.

In a specific implementation, the network devices 104 are wirelessly coupled, through a Wi-Fi connection, to a client device, which acts as or includes a station. Depending upon implementation-specific or other considerations, the network device 104 can form a wireless connection to a proximity beacon receiver through a Wi-Fi connection, whereby the proximity beacon receiver functions as a client device by including or acting as a station. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes WiFi systems. WiFi is a non-technical description that is generally correlated with the IEEE 802.11 standards, as well as WiFi Protected Access (WPA) and WPA2 security standards, and the Extensible Authentication Protocol (EAP) standard. In alternative embodiments, a station may comply with a different standard than WiFi or IEEE 802.11, may be referred to as something other than a "station," and may have different interfaces to a wireless or other medium.

In a specific implementation, the network device map datastore 106 functions to store network device map data. Network device map data, as used in this paper, includes data indicating locations of network devices within a region, e.g. a building. Depending upon implementation-specific or other considerations, network device map data can include a floor plan of a floor of a building. For example, network device map data can include floor dimensions of a region. In another example, network device map data can include obstructions, e.g. interior and exterior walls, within a region. Further depending upon implementation-specific or other considerations, network device map data can be received from an applicable entity for submitting network device map data, e.g. an entity installing and planning network device placement at a site, or an entity performing a site survey at the site.

In a specific implementation, the network device-coupled PBT 108 functions to transmit proximity beacon signals. As used in this paper, a proximity beacon signal transmitted by a network device-coupled PBT includes a signal transmitted in accordance with an applicable lower power short range wireless communication protocol, such as Bluetooth® or ZigBee®. A proximity beacon signal transmitted by the network device-coupled PBT 108 includes a unique universal identifier (hereinafter referred to as a "uuid") for the network device-coupled PBT 108. A uuid included as part of a proximity beacon signal transmitted by the network device-coupled PBT 108 is uniquely associated with the network device-coupled PBT 108 and can be used to specifically identify the network device-coupled PBT 108. A proximity beacon signal transmitted by the network device-coupled PBT 108 can include a minor value, and a major value.

In a specific implementation, a lower power short range wireless communication protocol is a protocol that is generally considered inadequate for transmitting data in high throughput communication systems. Depending upon implementation-specific or other considerations, a lower power short range wireless communication protocol can be a symmetric protocol. Further depending upon implementation-specific or other considerations, a lower power short range wireless communication protocol can be a protocol unsuitable for use in transmission of data from a backhaul of a network. Depending upon implementation-specific or other considerations, data transmitted according to a lower power short range wireless communication protocol can be transmitted at a maximum power less than a maximum transmit power of data transmitted according to 802.11 standards. For example, data transmitted according to a lower power short range wireless communication protocol can be transmitted at a maximum transmit power of 10 mW. Further depending upon implementation-specific or other considerations, data transmitted according to a lower power short range wireless communication protocol can be transmitted at a maximum data rate less than a maximum data rate of data transmitted according to 802.11 standards. For example, data transmitted according to a lower power short range wireless communication protocol can be transmitted at maximum data rate of 1 Mbit/s.

In a specific implementation, a proximity beacon signal transmitted by the network device-coupled PBT 108 can include data indicating environment conditions. Environment conditions, as used in this paper, include environment conditions of an environment around a PBT or environment conditions associated with a PBT. For example, environment conditions can include a temperature at a PBT. In another example, environment conditions can include an indication that a device a PBT is placed on, or otherwise associated with, is turned on. Depending implementation-specific or other considerations, the network device-coupled PBT 108 can receive input regarding environment conditions to include as data in transmitted proximity beacon signals, from sensors coupled to the network device-coupled PBT 108. Further depending upon implementation-specific or other considerations, the network device-coupled PBT 108 can receive input regarding environment conditions to include as data in transmitted proximity beacon signals, from actuators or switches coupled to the network device-coupled PBT 108 and operated by users. For example, a user can activate a switch indicating that a machine associated with the network device-coupled PBT 108 is in use, and the switch can provide input indicating that the switch is activated to the network device-coupled PBT 108.

In a specific implementation, the network device-coupled PBT 108 is coupled to the network devices 104. Depending upon implementation-specific or other considerations, the network device-coupled PBT 108 can be coupled to one or a plurality of network devices. Further depending upon implementation-specific or other considerations, the network device-coupled PBT 108 can be coupled to the network devices 104 through connections formed in accordance with an applicable lower power short range wireless communication protocol, such as Bluetooth® or ZigBee®. In being coupled to the network device-coupled PBT 108 through connections formed in accordance with an applicable lower power short range wireless communication protocol, the network devices 104 can receive proximity beacon signals transmitted by the network device-coupled PBT 108 according to the applicable lower power short range wireless communication protocol.

In a specific implementation, the network devices 104 can receive proximity beacon signals transmitted by the network device-coupled proximity beacon transmitter 108 through a proximity beacon receiver (hereinafter referred to as a "PBR"). Depending upon implementation-specific or other considerations a PBR receiving proximity beacon signals can be integrated as part of the network devices 104, e.g. included as hardware of the network devices 104, or through a separate device, e.g. a dongle or a proximity beacon transmitter hub, coupled to the network devices 104. A proximity beacon signal received at a network device can be assigned a received signal strength indication (hereinafter referred to as "RSSI") for the proximity beacon signal. A received channel power indication (RCPI) could also be used, as defined in IEEE 802.11k-2008, which is incorporated by reference, and which is treated for illustrative simplicity in this paper as a specific kind of RSSI.

RSSI of a proximity beacon signal received at a network device can vary depending upon a position of a network device-coupled PBT with respect to a network device and a transmit power at which the network device-coupled PBT transmits proximity beacon signals. A position of a network device-coupled PBT to a network device can include a distance, or a radial distance of the network device-coupled PBT to the network device. Depending upon implementation-specific or other considerations, RSSI of a proximity beacon signal can vary based on a distance between a network device-coupled PBT to a network device, obstructions between the network device-coupled PBT and the network device, or other factors.

In a specific implementation, the network devices 104 can generate and send RSSI reporting messages based on proximity beacon signals received by the network devices 104. A RSSI reporting message for a proximity beacon signal can include a RSSI of the proximity beacon signal, a unique identification of a network device and/or PBT hub that receives the proximity beacon signal, and a uuid of a network device-coupled PBT that transmitted the proximity beacon signal. Depending upon implementation-specific or other considerations, the network devices 104 can send RSSI messages as part of persistent messages sent from the network devices 104 describing proximity beacon signals received by the network devices. Depending upon implementation-specific or other considerations, a unique identification of a network device can include either or both a media access control address (hereinafter referred to as "MAC address") and an Internet Protocol address (hereinafter referred to as "IP address"). Further depending upon implementation-specific or other considerations, a RSSI reporting message for a proximity beacon signal can include environment conditions data of a network device-coupled PBT that transmits the proximity beacon signal. For example, a RSSI reporting message for a proximity beacon signal can include data specifying a temperature at a network device-coupled PBT that transmits the proximity beacon signal.

In a specific implementation, the proximity beacon positioning system 110 functions to determine a position of the network device-coupled PBT 108. The proximity beacon positioning system 110 can determine a position of the network device-coupled PBT 108 according to a position of the network device-coupled PBT 108 with respect to the network devices 104 to which the network device-coupled PBT 108 is coupled. For example, the proximity beacon positioning system 110 can determine a position of the network device-coupled PBT 108 with respect to at least one network device of the network devices 104 and determine a position of the at least one network device within a region to determine a position of the network device-coupled PBT 108. Depending upon implementation-specific or other considerations the proximity beacon positioning system 110 can determine a position of the network device-coupled PBT 108 according to a position of the network device-coupled PBT 108 with respect to a plurality of network devices of the network devices 104 to which the network device-coupled PBT 108 is coupled. For example, the proximity beacon positioning system 110 can determine a position of the network device-coupled PBT 108 through triangulation of the network device-coupled PBT 108 according to a position of the network device-coupled PBT 108 with respect to three network devices of the network devices 104.

In a specific implementation, in determining a position of the network device-coupled PBT 108, the proximity beacon positioning system 110 uses network device map data stored in the network device map datastore 106 and RSSI reporting messages to determine a position of at least one network device of the network devices 104 to which the network device-coupled PBT 108 is coupled. In using RSSI reporting messages to determine a position of at least one network device of the network devices 104, the proximity beacon positioning system 110 can determine an identification of the at least one network device of the network devices 104 to which the network device-coupled PBT 108 is coupled from the RSSI reporting messages. For example, the proximity beacon positioning system 110 can determine an identification of at least one network device of the network devices 104 based on unique identifications of the network devices 104 included in RSSI reporting messages received from the network devices 104. In using network device map data to determine a position of at least one network device of the network devices 104, the proximity beacon positioning system 110 can determine a position of at least one network device of the network devices 104 based on an identification of the at least one network device of the network devices 104 and the network device map data. For example, the proximity beacon positioning system 110 can use an identification of a network device to look up the network device on a floor plan to determine a position of the network device within a region.

In a specific implementation, the proximity beacon positioning system 110 determines a position of the network device-coupled PBT 108 with respect to at least one network device of the network devices 104 to which the network device-coupled PBT 108 is coupled based on a RSSI reporting message received from the at least one network device. In determining a position of the network device-coupled PBT 108 with respect to a network device of the network devices 104 using a RSSI reporting message received from the at least one network device, the proximity beacon positioning system can determine a RSSI of a proximity beacon signal received by the network device from the network device-coupled PBT 108. The proximity beacon positioning system 110 can determine a position of the network device-coupled PBT 108 with respect to a network device of the network devices 104 based on a RSSI determined from a RSSI reporting message. Depending upon implementation-specific or other considerations, the proximity beacon positioning system 110 can compare a RSSI of a proximity beacon signal transmitted by the network device-coupled PBT 108 to a transmit power of the network device-coupled PBT 108 to determine a position of the network device-coupled PBT 108. Further depending upon implementation-specific or other considerations, the proximity beacon positioning system 110 can compare RSSIs of a proximity beacon signal received at multiple network devices of the network devices 104 to determine a position or positions of the network device-coupled PBT 108 with respect to the multiple network devices.

In a specific implementation, the proximity beacon positioning system 110 can determine a position of the network device-coupled PBT 108 with respect to a network device of the network devices 104 to which the network device-coupled PBT 108 is coupled based on a RSSI reporting message received from the network device and network device map data. Depending upon implementation-specific or other considerations, the proximity beacon positioning system 110 can use a RSSI reporting message and obstruction data, included as part of network device map data, describing obstructions surrounding a network device of the network devices 104, to determine a position of the network device-coupled PBT 108 with respect to the network device. For example, if network device map data indicates a wall in proximity to a network device, then the proximity beacon positioning system 110 can determine a position of the network device-coupled PBT 108 with respect to the network device based on a RSSI of a proximity beacon signal transmitted by the network device-coupled PBT 108 and the characteristics of the wall. Further depending upon implementation-specific or other considerations, the proximity beacon positioning system 110 can determine a position of the network device-coupled PBT 108 with respect to a plurality of network devices of the network devices 104 based on a determined RSSI of proximity beacon signals received at the network devices and network device map data. Depending upon implementation-specific or other considerations, the proximity beacon positioning system 110 can determine a position of the network device-coupled PBT 108 with respect to a network device of the network devices 104 using network device map data and comparing a RSSI of a proximity beacon signal received at the network device to a transmit power of the proximity beacon signal transmitted from the network device-coupled PBT 108.

In a specific implementation, the proximity beacon positioning system 110 functions to determine environment conditions of the network device-coupled PBT 108. For example the proximity beacon positioning system 110 can determine a temperature at a proximity beacon. Depending upon implementation-specific or other considerations, the proximity beacon positioning system 110 can determine environment conditions of the network device-coupled PBT 108 from environment data included as part of RSSI reporting message received from a network device of the network devices 104.

In an example of operation of the example system shown in FIG. 1, the network devices 104 receive proximity beacon signals transmitted by the network device-coupled PBT 108. In the example of operation of the example system shown in FIG. 1, the network device map datastore 106 stores network device map data for a region in which the network devices 104 are located. Further, in the example of operation of the example system shown in FIG. 1, the proximity beacon positioning system 110 receives RSSI reporting messages from the network devices 104 based on the proximity beacon signals received at the network devices 104 from the network device-coupled proximity beacon transmitter 108. In the example of operation of the example system shown in FIG. 1, the proximity beacon positioning system 110 determines a position of the network device-coupled PBT 108 with respect to the network devices 104 based on the RSSI reporting messages. Additionally, in the example of operation of the example system shown in FIG. 1, the proximity beacon positioning system 110 determines a position of the network device-coupled PBT 108 within the region in which the network devices 104 are located based on the position of the network device-coupled PBT 108 with respect to the network devices 104 and the network device map data stored in the network device map datastore 106.

Figure 2:
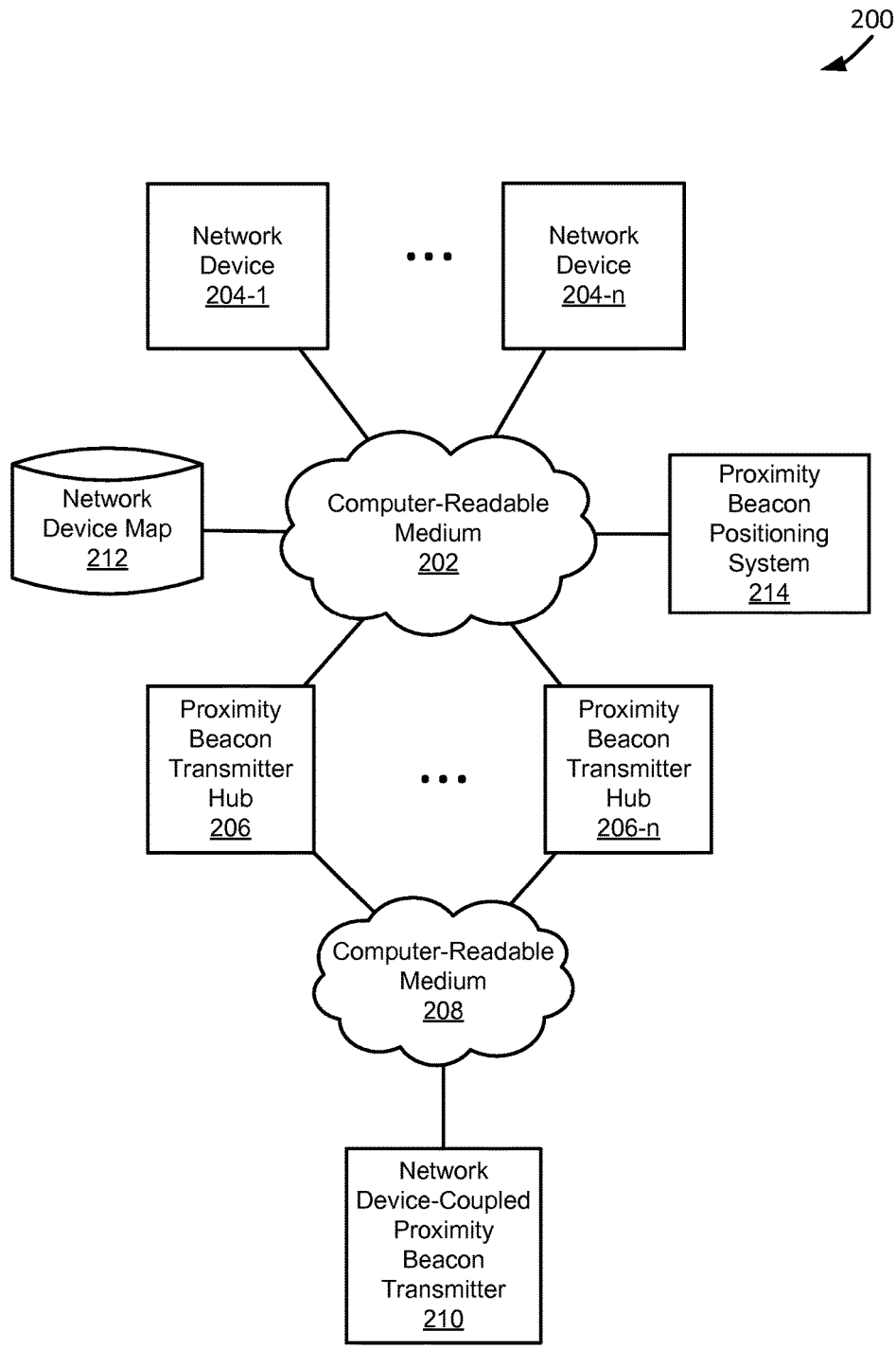
FIG. 2 depicts a diagram of an example of another system for network device-based position determination of network device-coupled PBTs.

FIG. 2 depicts a diagram 200 of an example of another system for network device-based position determination of network device-coupled PBTs. The example system shown in FIG. 2 includes a first computer-readable medium 202, network devices 204-1 . . . 204-n (hereinafter referred to as "network devices 204"), PBT hub 210 . . . 210-n (hereinafter referred to as "PBT hubs 210"), a second computer readable medium 208, a network device-coupled PBT 210, a network device map datastore 212, and a proximity beacon positioning system 214.

In the example system shown in FIG. 2, the network devices 204, the PBT hubs 206, the network device map datastore 212, and the proximity beacon positioning system 214 are coupled to each other through the first computer-readable medium 202. Depending upon implementation-specific or other considerations, the first computer-readable medium 202 or parts of the first computer-readable medium 202 can form a wired or a wireless connection. For example, the PBT hubs 206 can be coupled to the network devices 204 through either a wired connection, or a wireless connection.

In a specific implementation, the network devices 204 functions according to applicable devices for transmitting data to and from a backhaul of a network to a client, such as the network devices described in this paper. Depending upon implementation-specific or other considerations, the network devices 204 can transmit data to and from a backhaul of a network to a client either through a wired or a wireless connection. Further depending upon implementation-specific or other considerations, the network devices 204 can function to send and receive data used in determining a position of a network device-coupled PBT within a region the network devices 204 are located. For example, the network devices 204 can receive proximity beacon signal data and/or a proximity beacon signal used in generating a RSSI reporting message for the proximity beacon signal. Further in the example, the network devices 204 can send the RSSI reporting message to an applicable system for determining a position of a network device-coupled PBT that transmits the proximity beacon signal, such as the proximity beacon positioning systems described in this paper.

In a specific implementation, a PBT hub of the PBT hubs 206 can be connected to one or a plurality of the network devices 204. Depending upon implementation-specific or other considerations, each proximity beacon transmitter hub of the proximity beacon transmitter hubs 206 can be coupled to a single and distinct network device 204 of the network devices. Further depending upon implementation-specific or other considerations, the PBT hubs 206 can be coupled to the network devices 204 through either a wired or a wireless connection. For example the PBT hubs 206 can be coupled to the network devices 204 through an Ethernet connection.

In a specific implementation, the PBT hubs 206 function to receive proximity beacon signals transmitted by PBTs. The PBT hubs 206 can receive proximity beacon signals through a network created and maintained in accordance with an applicable lower power short range wireless communication protocol, such as Bluetooth® or ZigBee®. In receiving proximity beacon signals and being coupled to the network device 204, the PBT hubs 206 functions to couple PBTs to the network devices 204.

In a specific implementation, the PBT hubs 206 can send either or both a received proximity beacon signal and proximity beacon signal data for the received proximity beacon signal to the network devices 204. Depending upon implementation-specific or other considerations, the PBT hubs 206 can transmit received proximity beacon signals directly to the network devices 204. Further depending upon implementation-specific or other considerations, the PBT hubs 206 can determine proximity beacon signals data from received proximity beacons signals, and transmit the proximity beacon signals data to the network devices 204. Proximity beacon signal data, as used in this paper, can include data included in a proximity beacon signal and a RSSI of a received proximity beacon signal and a uuid of a PBT hub sending the proximity beacon signal data.

In the example system shown in FIG. 2, the PBT hubs 206 are coupled to the network device coupled-PBT 210 through the second computer-readable medium 208. Depending upon implementation-specific or other considerations, the second computer-readable medium 208 can be implemented to wirelessly connect the PBT hubs 206 to the network device-coupled proximity beacon transmitters through a wireless connection. A wireless connection that connects the PBT hubs 206 to the network device-coupled PBT 210 can be made according to an applicable lower power short range wireless communication protocol, such as Bluetooth® or ZigBee®.

In a specific implementation, the network device-coupled PBT 210 functions according to an applicable device for transmitting a proximity beacon signal, such as the network device-coupled PBTs described in this paper. Proximity beacon signals transmitted by the network device-coupled proximity PBT 210 can be transmitted at a transmit power. Proximity beacon signal transmitted by the network device-coupled proximity PBT 210 can have applicable data included in a proximity beacon signal, such as a uuid of the network device-coupled PBT 210.

In a specific implementation, the network device map datastore 212 functions according to an applicable datastore for storing network device map, such as the network device map datastores described in this paper. Network device map data stored in the network device map datastore 212 can include data indicating locations of network devices within a region, e.g. a building. Depending upon implementation-specific or other considerations, network device map data stored in the network device map datastore 212 can include data indicating locations of PBT hubs within a region. Further depending upon implementation-specific or other considerations, network device map data stored in the network device map datastore 212 can include a floor plan of a floor of a building. For example, network device map data can include dimensions of a region including the building. In another example, network device map data stored in the network device map datastore 212 can include obstructions within a floor of a building. Further depending upon implementation-specific or other considerations, network device map data stored in the network device map datastore 212 can be received from an applicable entity for submitting network device map data, e.g. an entity installing and planning network device placement at a site, or an entity performing a site survey at the site.

In a specific implementation, the proximity beacon positioning system 214 functions according to an applicable system for determining positions of network device-coupled PBTs within a region, such as the proximity beacon positioning systems described in this paper. In a specific implementation, the proximity beacon positioning system 214 functions to determine a position of the network device-coupled PBT 210. The proximity beacon positioning system 214 can determine a position of the network device-coupled PBT 210 according to a position of the network device-coupled PBT 210 with respect to the network devices 204 and/or PBT hubs 206 to which the network device-coupled PBT 210 is coupled. For example, the proximity beacon positioning system 214 can determine a position of the network device-coupled PBT 210 with respect to at least one network device of the network devices 204 and/or at least one PBT hub of the PBT hubs 206 and determine a position of the at least one network device and/or at least one PBT hub within a region to determine a position of the network device-coupled PBT 210. Depending upon implementation-specific or other considerations the proximity beacon positioning system 214 can determine a position of the network device-coupled PBT 210 according to a position of the network device-coupled PBT 210 with respect to a plurality of network devices of the network devices 204 and/or a plurality of PBT hubs of the PBT hubs 206 to which the network device-coupled PBT 210 is coupled. For example, the proximity beacon positioning system 214 can determine a position of the network device-coupled PBT 210 through triangulation of the network device-coupled PBT 210 according to a position of the network device-coupled PBT 210 with respect to three network devices of the network devices 204 and/or three PBT hubs of the PBT hubs 206.

In a specific implementation, in determining a position of the network device-coupled PBT 210, the proximity beacon positioning system 214 uses network device map data stored in the network device map datastore 106 and RSSI reporting messages to determine a position of at least one network device of the network devices 204 and/or at least one PBT hub of the PBT hubs 206 to which the network device-coupled PBT 210 is coupled. In using RSSI reporting messages to determine a position of at least one network device of the network devices 204 and/or at least one PBT hub of the PBT hubs 206, the proximity beacon positioning system 214 can determine an identification of the at least one network device of the network devices 204 and/or at least one PBT hub of the PBT hubs 206 to which the network device-coupled PBT 210 is coupled from the RSSI reporting messages. For example, the proximity beacon positioning system 214 can determine an identification of at least one network device of the network devices 204 based on unique identifications of the network devices 204 included in RSSI reporting messages received from the network devices 204. Depending upon implementation-specific or other considerations, the network devices 204 can generate and send a RSSI reporting message based on a proximity beacon signal and/or proximity beacon signal data received from the PBT hubs 206. In using network device map data to determine a position of at least one network device of the network devices 204 and/or at least one PBT hub of the PBT hubs 206, the proximity beacon positioning system 214 can determine a position of at least one network device of the network devices 204 and/or at least one PBT hub of the PBT hubs 206 based on an identification of the at least one network device and/or the at least one PBT hub and the network device map data. For example, the proximity beacon positioning system 214 can use an identification of a network device to look up the network device on a floor plan to determine the position of the network device.

In a specific implementation, the proximity beacon positioning system 214 determines a position of the network device-coupled PBT 210 with respect to at least one network device of the network devices 204 and/or at least one PBT hub of the PBT hubs 206 to which the network device-coupled PBT 210 is coupled based on a RSSI reporting message received from the at least one network device. In determining a position of the network device-coupled PBT 210 with respect to a network device of the network devices 204 and/or at least one PBT hub of the PBT hubs 206 using a RSSI reporting message received from the at least one network device, the proximity beacon positioning system 214 can determine a RSSI of a proximity beacon signal received by the network device from the network device-coupled PBT 210. The proximity beacon positioning system 214 can determine a position of the network device-coupled PBT 210 with respect to a network device of the network devices 204 and/or a PBT hub of the PBT hubs 206 based on a RSSI determined from a RSSI reporting message. Depending upon implementation-specific or other considerations, the proximity beacon positioning system 214 can compare a RSSI of a proximity beacon signal transmitted by the network device-coupled PBT 210 to a transmit power of the network device-coupled PBT 210 to determine a position of the network device-coupled PBT 210. Further depending upon implementation-specific or other considerations, the proximity beacon positioning system 214 can compare RSSIs of a proximity beacon signal received at multiple network devices of the network devices 204 and/or multiple PBT hubs of the PBT hubs 206 to determine a position or positions of the network device-coupled PBT 210 with respect to the multiple network devices and/or the multiple PBT hubs.

In a specific implementation, the proximity beacon positioning system 214 can determine a position of the network device-coupled PBT 210 with respect to a network device of the network devices 204 and/or a PBT hub of the PBT hubs 206 to which the network device-coupled PBT 210 is coupled based on a RSSI reporting message received from the network device and network device map data. Depending upon implementation-specific or other considerations, the proximity beacon positioning system 214 can use a RSSI reporting message and obstruction data, included as part of network device map data, describing obstructions surrounding a network device of the network devices 204 and/or a PBT hub of the PBT hubs 206, to determine a position of the network device-coupled PBT 210 with respect to the network device and/or the PBT hub. For example, if network device map data indicates a wall in proximity to a network device, then the proximity beacon positioning system 214 can determine a position of the network device-coupled PBT 210 with respect to the network device based on a RSSI of a proximity beacon signal transmitted by the network device-coupled PBT 210 and the characteristics of the wall. Further depending upon implementation-specific or other considerations, the proximity beacon positioning system 214 can determine a position of the network device-coupled PBT 210 with respect to a plurality of network devices of the network devices 204 and/or a plurality of PBT hubs of the PBT hubs 206 based on a determined RSSI of proximity beacon signals received at the network devices and network device map data. Depending upon implementation-specific or other considerations, the proximity beacon positioning system 214 can determine a position of the network device-coupled PBT 210 with respect to a network device of the network devices 204 and/or a PBT hub of the PBT hubs 206 using network device map data and comparing a RSSI of a proximity beacon signal received at the network device to a transmit power of the network device-coupled PBT 210.

In a specific implementation, the proximity beacon positioning system 214 functions to determine environment conditions of the network device-coupled PBT 210. For example the proximity beacon positioning system 214 can determine a temperature at a proximity beacon. Depending upon implementation-specific or other considerations, the proximity beacon positioning system 214 can determine environment conditions of the network device-coupled PBT 210 from environment data included as part of RSSI reporting message received from a network device of the network devices 204.

In an example of operation of the example system shown in FIG. 2, PBT hubs 206 receive proximity beacon signals transmitted by the network device-coupled PBT 210. In the example of operation of the example system shown in FIG. 2, the network devices 204 transmit the proximity beacon signals or proximity beacon signal data of the proximity beacon signals to the network devices 204. Further in the example of operation of the example system shown in FIG. 2, the network device map datastore 212 stores network device map data for a region in which the network devices 204 and the PBT hubs 206 are located. In the example of operation of the example system shown in FIG. 2, the proximity beacon positioning system 214 receives RSSI reporting messages from the network devices 204 based on the proximity beacon signals received at the PBT hubs 206 from the network device-coupled proximity beacon transmitter 210. Additionally, in the example of operation of the example system shown in FIG. 2, the proximity beacon positioning system 214 determines a position of the network device-coupled PBT 210 with respect to the network devices 204 and/or the PBT hubs 206 based on the RSSI reporting messages. In the example of operation of the example system shown in FIG. 2, the proximity beacon positioning system 214 determines a position of the network device-coupled PBT 210 within the region in which the network devices 204 and/or the PBT hubs 206 are located based on the position of the network device-coupled PBT 210 with respect to the network devices 204 and/or the PBT hubs 206 and the network device map data stored in the network device map datastore 212.

Figure 3:
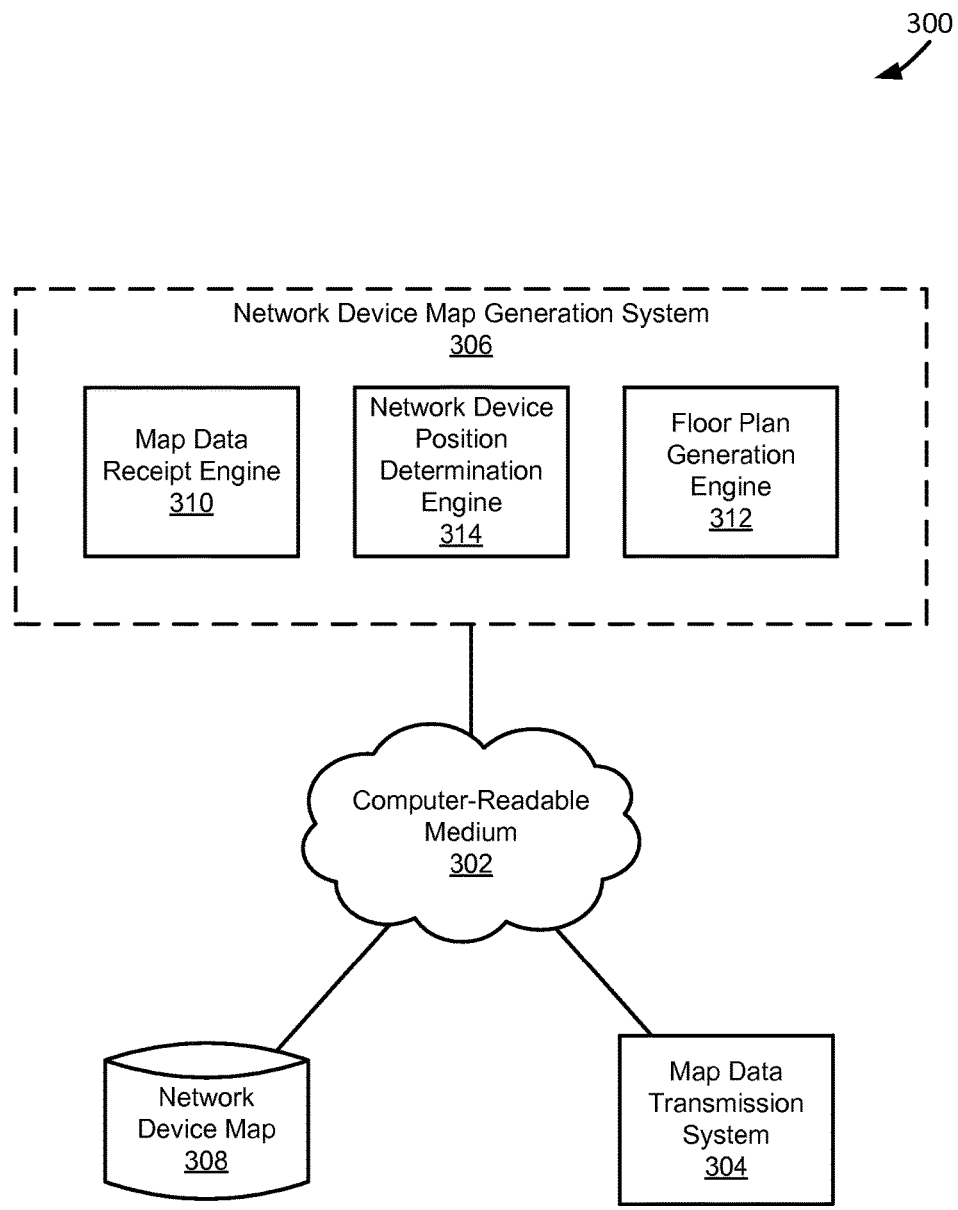
FIG. 3 depicts a diagram of an example of a system for generating network device map data.

FIG. 3 depicts a diagram 300 of an example of a system for generating network device map data. The example system shown in FIG. 3 includes a computer-readable medium 302, a map data transmission system 304, and a network device map datastore 308. In the example system shown in FIG. 3, the map data transmission system 304, the network map generation system 306, and the network device map datastore 308 are coupled to each other through the computer-readable medium 302.

In a specific implementation, the map data transmission system functions 304 to transmit map data. Map data, as used in this paper, includes applicable data used to build a network device map included as part network device map data. Map data can include dimensions of a region, e.g. floor dimensions including an outline of the footprint of a floor and/or the height or heights of a floor. Map data can also include obstructions within a region (e.g. walls, both interior and exterior) and dimensions and material compositions of the obstructions. Additionally, map data can specify positions of network devices and/or PBT hubs within a region.

In a specific implementation, the map data transmission system 304 functions to transmit already existing map data after a network device map for a region has been generated. Depending upon implementation-specific or other considerations, the map data transmission system 304 can transmit data from an entity that installs network devices and/or PBT hubs within a region and generates the network device map for the region. For example, the map data transmission system 304 can be part of a network device installation entity's system. Further depending upon implementation-specific or other considerations, the map data transmission system 304 can transmit data from an entity that performs a site survey on a region. For example, the map transmission system 304 can be part of an entity for conducting a site survey on a region. Depending upon implementation-specific or other considerations, the map transmission system 304 can be part of a client device, a thin client device, or an ultra-thin client device. For example, the map transmission system 304 can be a portable client device that a person conducting a site survey uses to transmit map data.

In a specific implementation, the network device map generation system 306 functions to generate network device map data. The network device map generation system 306 can generate network device map data based on map data received from the map data transmission system 304. In generating network device map data, the network device map generation system 306 can generate a floor plan of a region based on map data. For example, the network device map generation system 306 can generate floor dimensions of a floor based on received map data to create a floor plan. In another example, the network device map generation system 306 can add obstructions and dimensions and characteristics of the obstructions to floor dimensions using map data to create a floor plan. In generating network device map data, the network device map generation system 306 can add position indicators of either or both network devices and PBT hubs within a region to a floor plan of the region. For example, network device map generation system 306 can add position indicators of network devices to a floor plan of a region relative to obstructions within the region to indicate positions of network devices within the region.

In a specific implementation, the network device map datastore 308 functions according to an applicable datastore for storing network device map data, such as the network device map datastores described in this paper. Network device map data stored in the network device map datastore 308 can be generated by the network device map generation system 306 in response to received map data. Network device map data stored in the network device map datastore 308 can include a floor plan, including dimensions of a region, and obstructions within the region.

In the example system shown in FIG. 3, the network device map generation system 306 includes, a map data receipt engine 310, a floor plan generation engine 312, and a network device position determination engine 314. In a specific implementation, the map data receipt engine 310 functions to receive map data used in generating network device map data. The map data receipt engine 310 can receive map data from the map data transmission system 304. Depending upon implementation-specific or other considerations, the map data receipt engine 310 can receive map data through a network, a portion of which is implemented as a wireless network.

In a specific implementation, the floor plan generation engine 312 functions to generate a floor plan for a region, included as part of network device map data for the region. The floor plan generation engine 312 can generate a floor plan, included as part of network device map data, from received map data. In generating a floor plan, the floor plan generation engine 312 can determine dimensions of a region based on received map data. For example, the floor plan generation engine 312 can determine that a region is 2000 feet by 2000 feet by 2000 feet. Further in generating a floor plan, the floor plan generation engine 312 can determine obstructions, e.g. interior and exterior walls, within dimensions that define a region. For example, the floor plan generation engine 312 can determine that the region has exterior walls of a thickness of two feet. Depending upon implementation-specific or other considerations, the floor plan generation engine 312 functions to generate network device map data stored in the network device map datastore 308 including a floor plan of a region.

In a specific implementation, the network device position determination engine 314 functions to include positions indicators, included as part of network device map data for a region, signifying positions of network devices and/or PBT hubs within a floor plan of the region. The network device position determination engine 314 can determine position indicators of network devices and/or PBT hubs from received map data. Further, the network device position determination engine 314 can add position indicators of network devices and/or PBT hubs in a floor plan for a region generated by the floor plan generation engine 312. Depending upon implementation-specific or other considerations, the network device position determination engine 314 functions to generate network device map data stored in the network device map datastore 308 including positions indicators of network device and/or PBT hubs within a floor plan of a region.

In an example of operation of the example system shown in FIG. 3, the map data transmission system 304 sends map data for a region to the network device map generation system 306. In the example of operation of the example system shown in FIG. 3, the network device map datastore 308 stores network device map data generated by the network device map generation system 306. Further, in the example of operation of the example system shown in FIG. 3, the map data receipt engine 310 receives map data from the map data transmission system 304. In the example of operation of the example system shown in FIG. 3, the floor plan generation engine 312 generates, from the map data, a floor plan for a region, included as part of the network device map data stored in the network device map datastore 308. Additionally, in the example of operation of the example system shown in FIG. 3, the network device position determination engine 314 generates, from the map data, position indicators that signify positions within the floor plan of network devices and PBT hubs within a region, the position indicators included as part of the network device data stored in the network device map datastore 308.

Figure 4:
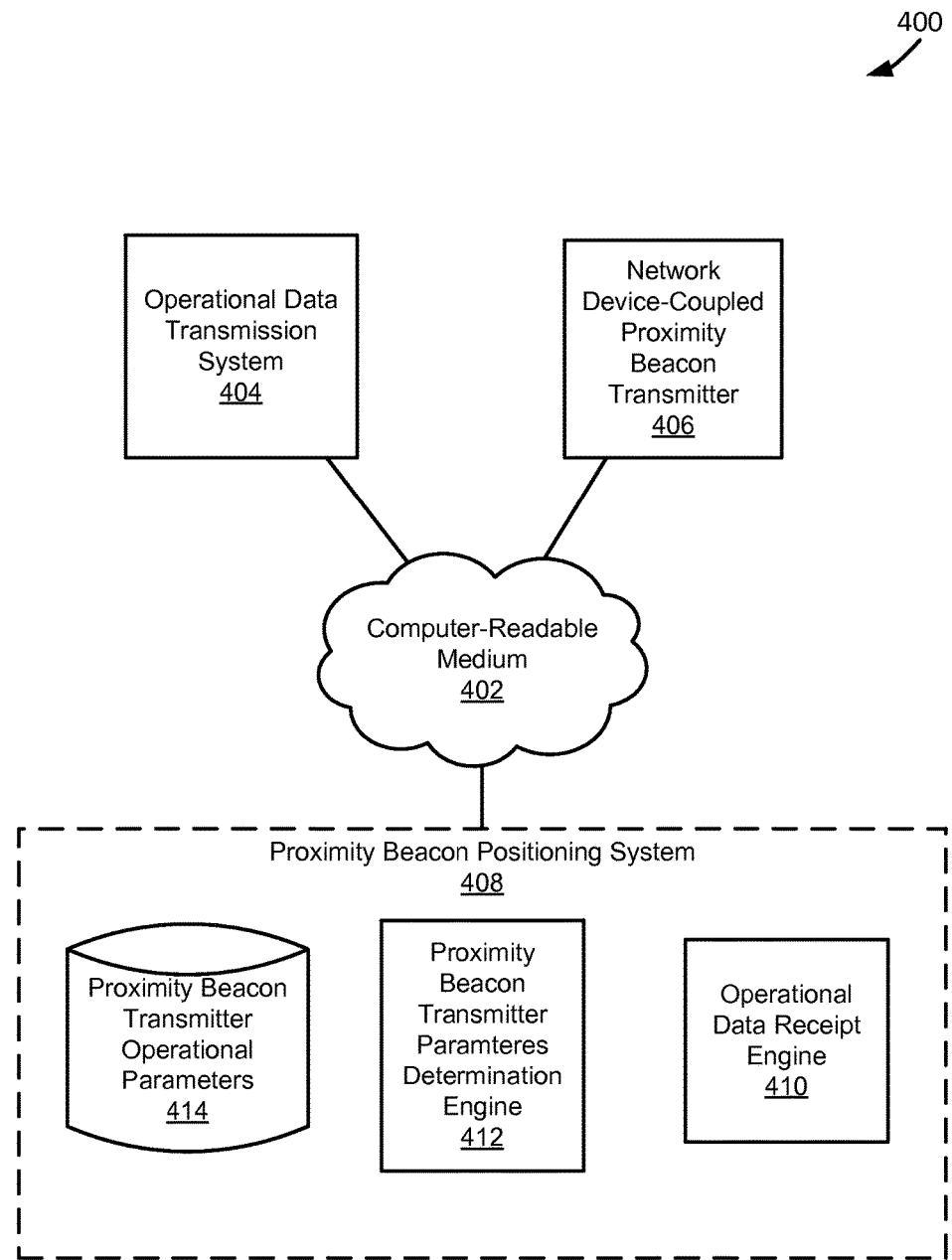
FIG. 4 depicts a diagram of an example of a system for determining operational parameters of PBTs.

FIG. 4 depicts a diagram 400 of an example of a system for determining operational parameters of PBTs. The example system shown in FIG. 4 includes a computer-readable medium 402, an operational data transmission system 404, a network device-coupled PBT 406, and a proximity beacon positioning system 408. In the example system shown in FIG. 4, the operational data transmission system 404, the network device-coupled PBT 406, and the proximity beacon positioning system 408 are coupled to each other through the computer-readable medium 402.

In a specific implementation, the operational data transmission system 404 functions to transmit operational data of PBTs. As used in this paper, operational data of PBTs includes applicable data used to determine operational parameters of PBTs. Operational data of PBTs can include a transmit power of proximity beacon signals transmitted by a PBT, a minor value, and a major value of proximity beacon signal transmitted by a PBT, and a uuid of a PBT included in a proximity beacon signal transmitted by a PBT. Depending upon implementation-specific or other considerations, the operational data transmission system 404 can be part of a system for programming and or managing PBTs to operate according to specific operational parameters. For example, the operational data transmission system 404 can be a system for managing PBTs that sets the operational parameters of the PBTs.

In a specific implementation, the network device-coupled PBT 406 functions according to an applicable device for transmitting proximity beacon signals, such as the network device-coupled PBTs described in this paper. In transmitting proximity beacon signals, the network device-coupled PBT 406 can transmit operational data for the network device-coupled PBT 406. Depending upon implementation-specific or other considerations, the network device-coupled PBT 406 transmits operational data through proximity beacon signals transmitted by the network device-coupled PBT 406. For example, the network device-coupled PBT 406 can transmit a proximity beacon signal that includes a transmit power of the proximity beacon signal, a major value, a minor value, and a uuid of the network device-coupled PBT 406.

In a specific implementation, the proximity beacon positioning system 408 functions according to an applicable system for determining a position of a PBT, such as the proximity beacon positioning systems described in this paper. In determining a position of a PBT, the proximity beacon positioning system 408 can determine PBT operational parameters of a PBT. Depending upon implementation-specific or other considerations, the proximity beacon positioning system 408 can determine PBT operational parameters from operational data and/or proximity beacon signals received from the PBT.

In the example system shown in FIG. 4, the proximity beacon positioning system 408 includes an operational data receipt engine 410, a PBT parameters determination engine 412, and a PBT operational parameters datastore 414. In a specific implementation, the operational data receipt engine 410 functions to receive operational data. Depending upon implementation-specific or other considerations, the operational data receipt engine 410 can receive operational data from either or both the operational data transmission system 404 and the network device-coupled PBT 406. Further depending upon implementation-specific or other considerations, the proximity beacon positioning system 408 can generate PBT operational data used to determine a position of a PBT.

In the example system shown in FIG. 4, the proximity beacon positioning system 408 includes an operational data receipt engine 410, a PBT parameters determination engine 412, and a PBT operational parameters datastore 414. In a specific implementation, the operational data receipt engine 410 functions to receive operational data and/or proximity beacon signals. Depending upon implementation-specific or other considerations, the operational data receipt engine 410 can receive operational data from either or both the operational data transmission system 404 and the network device-coupled PBT 406. Further depending upon implementation-specific or other considerations, the operational data receipt engine 410 can receive proximity beacon signals from the network device-coupled PBT 406.

In a specific implementation, the PBT parameters determination engine 412 functions to determine PBT operational parameters of PBTs. Operational parameters of PBTs, as uses in this paper, include applicable parameters at which a PBT operates at. Operational parameters of PBTs can include a transmit power of proximity beacon signals transmitted by the PBT, a major value included in the proximity beacon signal, a minor value included in the proximity beacon signal, and a uuid of the PBT. The PBT parameters determination engine 412 can generate operational parameters of a PBT from received operational data. Depending upon implementation-specific or other considerations, operational data used to generate operational parameters for a PBT can be determined from a proximity beacon signal received from the PBT.

In a specific implementation, the PBT operational parameters datastore 414 functions to store operational parameters data. Operational parameters data, as used in this paper, includes operational parameters of PBTs. Depending upon implementation-specific or other considerations, the PBT operational parameters datastore 414 can store operational parameters data including operational parameters determined by the PBT parameters determination engine 412. For example, the PBT operational parameters datastore 414 can store operational parameters including a transmit power of proximity beacon signals transmitted by a PBT.

In an example of operation of the example system shown in FIG. 4, the operational data transmission system 404 and the network device-coupled PBT 406 send operational data and proximity beacon signals to the proximity beacon positioning system 408. In the example of operation of the example system shown in FIG. 4, the operational data receipt engine 410 receives operational data and proximity beacon signals. Further, in the example of operation of the example system shown in FIG. 4, the PBT parameters determination engine 412 determines operational parameters of the network device-coupled PBT 406 from the operational data and the proximity beacon signal received by the operational data receipt engine 410. In the example of operation of the example system shown in FIG. 4, the PBT operational parameters datastore 414 stores operational parameters for the network device-coupled PBT 406, as determined by the PBT parameters determination engine 412.

Figure 5:
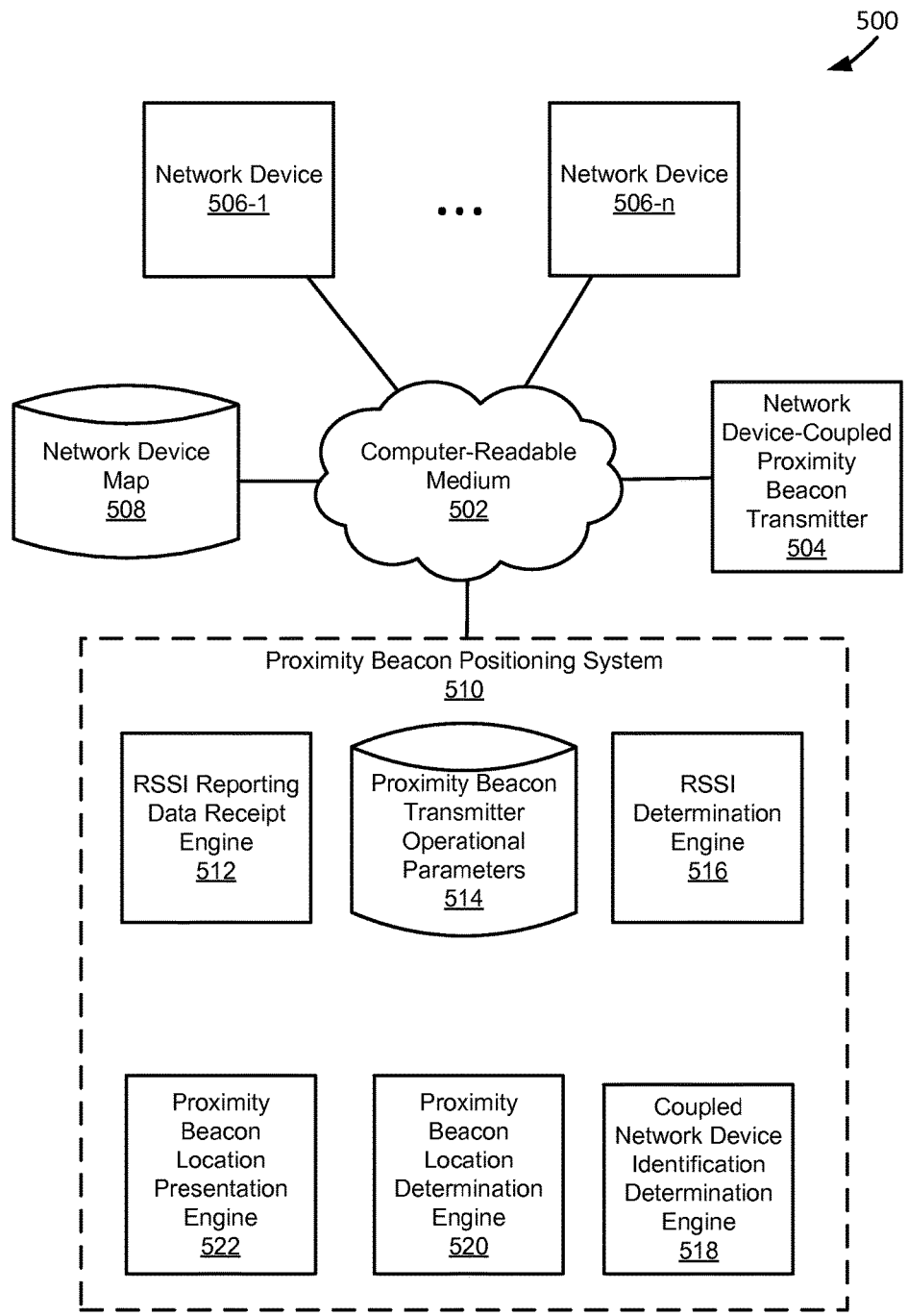
FIG. 5 depicts a diagram of an example of a system for determining network device-coupled PBT location based on proximity to network devices and/or PBT hubs.

FIG. 5 depicts a diagram 500 of an example of a system for determining network device-coupled PBT location based on proximity to network devices and/or PBT hubs. The example system shown in FIG. 5 includes a computer readable medium 502, a network device-coupled PBT 504, network device 506-1 . . . 506-n (hereinafter referred to as "network devices 506"), a network device map datastore 508, and a proximity beacon positioning system 510. In the example system shown in FIG. 5, the network device-coupled PBT 504, the network devices 506, the network device map datastore 508, and the proximity beacon positioning system 510 are coupled to each other through the computer-readable medium 502.

In a specific implementation, the network device-coupled PBT 504 functions according to an applicable device for transmitting proximity beacon signals, such as the network device-coupled PBTs described in this paper. The network device-coupled PBT 504 can transmit proximity beacon signals in accordance with applicable lower power short range wireless communication protocol, such as Bluetooth® or ZigBee®. For example, the network device-coupled PBT 504 can transmit proximity beacon signals over a network including communication channels maintained, at least in part, according to an applicable low power short range wireless communication protocol.

In a specific implementation, the network devices 506 function according to applicable device for transmitting data to and from a backhaul of a network to a client, such as the network devices described in this paper. Depending upon implementation-specific or other considerations, the network devices 506 can transmit data to and from a backhaul of a network to a client either through a wired or a wireless connection. Further depending upon implementation-specific or other considerations, the network devices 506 can function to send and receive data used in determining a position of a network device-coupled PBT within a region the network devices 506 are located. For example, the network devices 506 can receive proximity beacon signal data and/or a proximity beacon signal used in generating a RSSI reporting message for the proximity beacon signal. Further in the example, the network devices 506 can send the RSSI reporting message to an applicable system for determining a position of a network device-coupled PBT that transmits the proximity beacon signal, such as the proximity beacon positioning systems described in this paper.

In a specific implementation, the network devices 506 receive proximity beacon signals directly from the network device-coupled PBT 504. Proximity beacon signals received by the network devices 506 from the network device-coupled PBT 504 can be used to determine a position of the network device-coupled PBT 504 within a region in which the network devices 506 are located. In sending proximity beacon signals directly to the network devices 506, the network device-coupled PBT 504 is coupled to the network devices.

In a specific implementation, the network devices 506 receive proximity beacon signals and/or proximity beacon signals data from an intermediary device, e.g. a PBT hub, coupled to the network devices 506 that receives proximity beacon signals from the network device-coupled PBT 504. Proximity beacon signals and/or proximity beacon signals data received by the network devices 506 can be used to determine a position of the network device-coupled PBT 504 within a region in which the network devices 506 are located. As the network devices 506 receive proximity beacon signals and/or proximity beacon signals data through an intermediary device receiving proximity beacon signals transmitted by the network device-coupled PBT 504, the network device-coupled PBT 504 is coupled to the network devices 506 through the intermediary device.

In a specific implementation, the network device map datastore 508 functions according to an applicable datastore for storing network device map data, such as the network device map datastores described in this paper. Network device map data stored in the network device map datastore 508 can include data indicating locations of network devices within a region, e.g. a building. Depending upon implementation-specific or other considerations, network device map data stored in the network device map datastore 508 can include data indicating locations of PBT hubs within a region. Further depending upon implementation-specific or other considerations, network device map data stored in the network device map datastore 508 can include a floor plan of a floor of a building. For example, network device map data can include dimensions of a region including the building. In another example, network device map data stored in the network device map datastore 508 can include obstructions within a floor of a building. Further depending upon implementation-specific or other considerations, network device map data stored in the network device map datastore 508 can be received from an applicable entity for submitting network device map data, e.g. an entity installing and planning network device placement at a site, or an entity performing a site survey at the site.

In a specific implementation, the proximity beacon positioning system 510 functions according to an applicable system for determining location of a PBT within a region, such as the proximity beacon positioning systems described in this paper. Depending upon implementation-specific or other considerations, the proximity beacon positioning system 510 can determine the location of a PBT within a region based on the proximity of the PBT to at least one network device within the region. Further depending upon implementation-specific or other considerations, the proximity beacon positioning system 510 can determine the location of a PBT within a region based on the proximity of the PBT to at least one PBT hub within the region.

In the example system shown in FIG. 5, the proximity beacon positioning system 510 includes a RSSI reporting data receipt engine 512, a proximity beacon transmitter operational parameters datastore 514, a RSSI determination engine 516, a coupled network device identification determination engine 518, a proximity beacon location determination engine 520, and a proximity beacon location presentation engine 522. In a specific implementation, the RSSI reporting data receipt engine 512 functions to receive RSSI reporting messages. The RSSI reporting data receipt engine 512 can receive RSSI reporting messages from the network devices based on proximity beacon signals transmitted by the network device-coupled PBT 504. A RSSI reporting message received by the RSSI reporting data receipt engine can include a RSSI of a proximity beacon signal, a unique identification of a network device that receives the proximity beacon signal and/or proximity beacon signal data for the proximity beacon signal, and a uuid of a network device-coupled PBT that transmitted the proximity beacon signal.

In a specific implementation, the PBT operational parameters datastore 514 functions according to an applicable datastore for storing operational parameters data of a PBT, such as the operational parameters datastores described in this paper. Operational parameters data stored in the PBT operational parameters datastore 514 can include a transmit power of proximity beacon signals transmitted by a PBT, a major and minor value included in the proximity beacon signals, and a uuid of the PBT.

In a specific implementation, the RSSI determination engine 516 functions to determine a RSSI of a proximity beacon signal transmitted by a PBT. The RSSI determination engine 516 can determine a RSSI of a proximity beacon signal transmitted by a PBT received at a network device or a PBT hub. The RSSI determination engine can determine a RSSI of a proximity beacon signal from a received RSSI reporting message.

In a specific implementation, the coupled network device identification determination engine 518 functions to determine a network device and/or a PBT hub coupled to a PBT. The coupled network device identification determination engine 518 can determine a coupled network device from received RSSI reporting messages. For example the coupled network device identification determination engine 518 can determine an identification of a network device and/or a PBT hub from a RSSI reporting message including a unique identification of either or both the network device and the PBT hub.

In a specific implementation, the proximity beacon location determination engine 520 functions to determine a location of a PBT within a region. The proximity beacon location determination engine 520 can determine a position of the network device-coupled PBT 210 according to a position of the network device-coupled PBT 504 with respect to the network devices 506 and/or PBT hubs to which the network device-coupled PBT 504 is coupled. For example, the proximity beacon location determination engine 520 can determine a position of the network device-coupled PBT 504 with respect to at least one network device of the network devices 506 and/or at least one PBT hub and determine a position of the at least one network device and/or the at least one PBT hub within a region to determine a position of the network device-coupled PBT 504. For example, the proximity beacon location determination engine 520 can determine that the network device-coupled PBT 504 is within 10 feet of a network device of the network devices 506, and based on a position of the network device within a region, can determine that the network device-coupled PBT 504 is at a position within the region ten feet away from the position of the network device in the region.

In a specific implementation, the proximity beacon location determination engine 520 can determine a position of the network device-coupled PBT 504 according to a position of the network device-coupled PBT 504 with respect to a plurality of network devices of the network devices 506 and/or a plurality of PBT hubs which the network device-coupled PBT 504 is coupled. For example, the proximity beacon location determination engine 520 can determine a position of the network device-coupled PBT 504 through triangulation of the network device-coupled PBT 504 according to a position of the network device-coupled PBT 504 with respect to three network devices of the network devices 506 and/or three PBT hubs.

In a specific implementation, in determining a position of the network device-coupled PBT 504, the proximity beacon location determination engine 520 uses network device map data stored in the network device map datastore 508 and RSSI reporting messages received by the RSSI reporting data receipt engine 512 to determine a position of at least one network device of the network devices 506 and/or at least one PBT hub to which the network device-coupled PBT 504 is coupled. In using RSSI reporting messages to determine a position of at least one network device of the network devices 506 and/or at least one PBT hub to which the network device-coupled PBT 504 is coupled, the proximity beacon location determination engine 520 can utilize an identification of the at least one network device and/or the at least one PBT hub, as determined by the coupled network device identification determination engine 518. In using network device map data to determine a position of at least one network device of the network devices 506 and/or at least one PBT hub, the proximity beacon location determination engine 520 can determine a position of the at least one network device and/or the at least one PBT hub by looking up an identification of the at least one network device and/or the at least one PBT hub in positioning indicators included as part of network device map data stored in the network device map datastore 508. For example if a position indicator corresponding to an identification of a network device of the network devices 506, as determined by the coupled network device identification determination engine 518, indicates the network device is in the center of a room, then the proximity beacon location determination engine 520 can determine that the network device is in the center of the room.

In a specific implementation, the proximity beacon location determination engine 520 determines a position of the network device-coupled PBT 520 with respect to at least one network device of the network devices 506 and/or at least one PBT hub to which the network device-coupled PBT 504 is coupled based on a RSSI reporting message received from the at least one network device. In determining a position of the network device-coupled PBT 504 with respect to a network device of the network devices 506 and/or at least one PBT hub using a RSSI reporting message received from the at least one network device, the proximity location determination engine 520 can use a RSSI of a proximity beacon signal received by the network device at least one network device, as determined by the RSSI determination engine 516. Depending upon implementation-specific or other considerations, the proximity beacon location determination engine 520 can compare a RSSI of a proximity beacon signal transmitted by the network device-coupled PBT 504 to a transmit power of the network device-coupled PBT 504, as included as part of operational parameters data stored in the proximity beacon transmitter operational parameters datastore 514, to determine a position of the network device-coupled PBT 504. For example if a RSSI indicates a proximity beacon signal is received at a power half of a transmit power of the proximity beacon signal, then the proximity beacon location determination engine 520 can determine that a network device-coupled PBT that transmitted the proximity beacon signal is ten feet from a network device that received the proximity beacon signal. Further depending upon implementation-specific or other considerations, the proximity beacon location determination engine 520 can compare RSSIs of a proximity beacon signal received at multiple network devices of the network devices 506 and/or multiple PBT hubs to determine a position or positions of the network device-coupled PBT 504 with respect to the multiple network devices and/or the multiple PBT hubs.

In a specific implementation, the proximity beacon location determination engine 520 can determine a position of the network device-coupled PBT 504 with respect to a network device of the network devices 506 and/or a PBT hub to which the network device-coupled PBT 504 is coupled based on a RSSI reporting message received from the network device and network device map data. Depending upon implementation-specific or other considerations, the proximity beacon location determination engine 520 can use a RSSI reporting message and obstruction data, included as part of network device map data stored in the network device map datastore 508 and describing obstructions surrounding a network device of the network devices 506 and/or a PBT hub, to determine the position of the network device-coupled PBT 504 with respect to the network device and/or the PBT hub. For example, if network device map data indicates a wall in proximity to a network device, then the proximity beacon location determination engine 520 can determine a position of the network device-coupled PBT 504 with respect to the network device based on a RSSI of a proximity beacon signal transmitted by the network device-coupled PBT 504, as determined by the RSSI determination engine 516, and the characteristics of the wall. Further depending upon implementation-specific or other considerations, the proximity beacon location determination engine 520 can determine a position of the network device-coupled PBT 504 with respect to a plurality of network devices of the network devices 506 and/or a plurality of PBT hubs based on a determined RSSI of a proximity beacon signal received at the network devices and network device map data stored in the network device map datastore 508. Depending upon implementation-specific or other considerations, the proximity beacon location determination engine 520 can determine a position of the network device-coupled PBT 504 with respect to a network device of the network devices 506 and/or a PBT hub using network device map data and comparing a RSSI of a proximity beacon signal received at the network device, as determined by the RSSI determination engine 516, to a transmit power of the proximity beacon signal, included as operational parameters data stored in the PBT operational parameters datastore 514.

In a specific implementation, the proximity beacon location presentation engine 522 functions to display a location of a network device-coupled PBT to a user. In presenting a location of a network device-coupled PBT to a user, the proximity beacon location presentation engine 522 can send PBT location presentation data to a user. PBT location presentation data can include a map of a region and a position indicator that indicates the location of a network device-coupled PBT within the region. Depending upon implementation-specific or other considerations, PBT location presentation data can include network device map data used in generating a display of a floor plan of the region for a user.

In an example of operation of the example system shown in FIG. 5, the network device-coupled PBT 504 transmits a proximity beacon signal to either the network devices 506 or a PBT hub coupled to the network devices 506. In the example of operation of the example system shown in FIG. 5, the network devices transmit RSSI reporting messages based on the proximity beacon signal to the proximity beacon positioning system 510. Further, in the example of operation of the example system shown in FIG. 5, the RSSI reporting data receipt engine 512 receives the RSSI reporting messages from the network devices 506. In the example of operation of the example system shown in FIG. 5, the RSSI determination engine 516 determines the RSSI of the proximity beacon signal as it is received at either the network devices 506 or PBT hubs coupled to the network devices based on the RSSI reporting messages. Additionally, in the example of operation of the example system shown in FIG. 5, the coupled network device identification determination engine 518 determines an identification of the network devices 506 using the RSSI reporting messages. In the example of operation of the example system shown in FIG. 5, the proximity beacon location determination engine 520 determines a location of the network device-coupled PBT 504 based on the RSSIs determined by the RSSI determination engine 516 and the identification of the network devices 506 determined by the coupled network device identification determination engine 518 using network device map data and operational parameters data. Further, in the example of operation of the example system shown in FIG. 5, the proximity beacon location presentation engine 522 facilitates presentation of the location of the network device-coupled PBT 504 within a region to a user.

Figure 6:
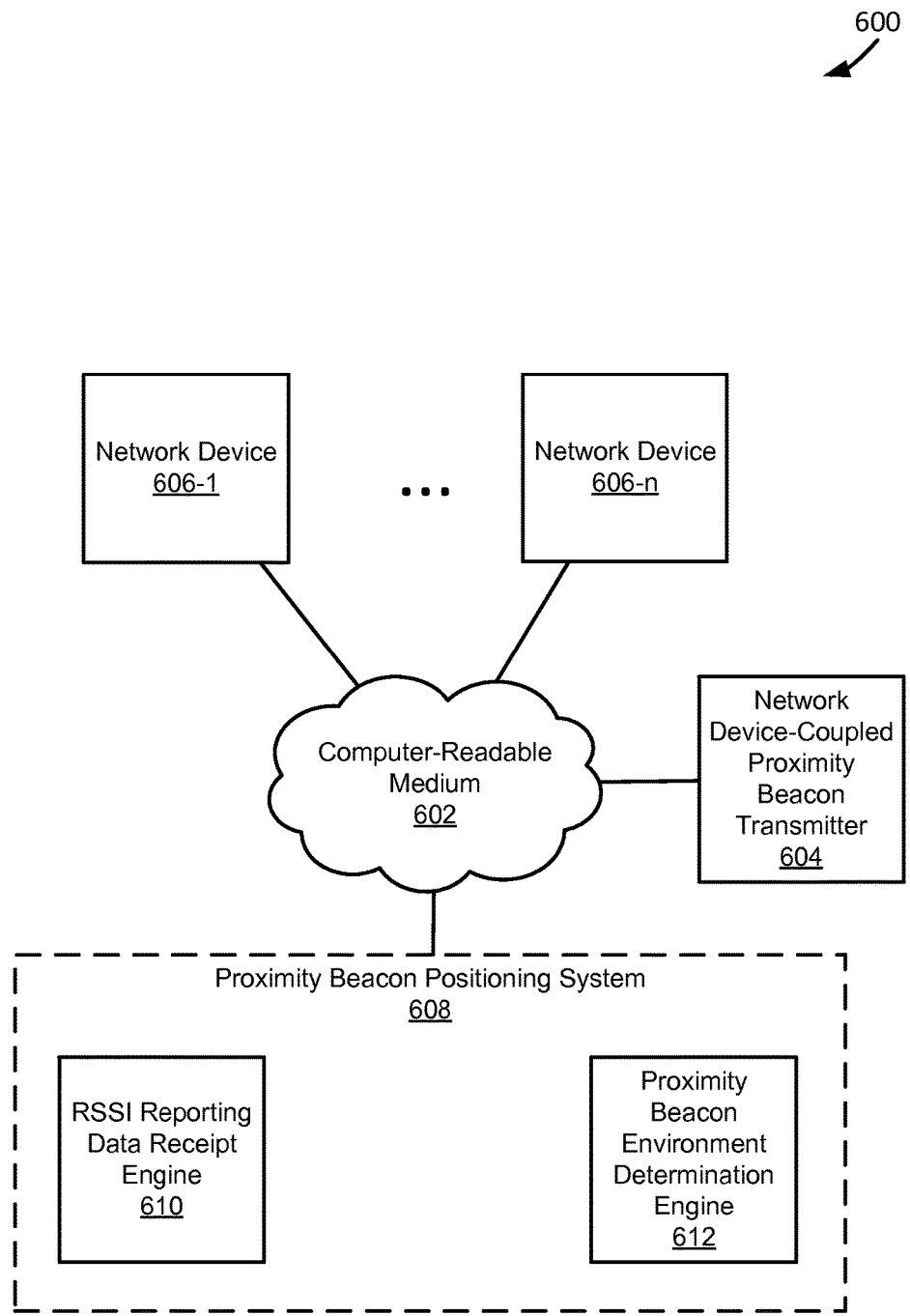
FIG. 6 depicts a diagram of an example of a system for determining environment conditions for a PBT.

FIG. 6 depicts a diagram 600 of an example of a system for determining environment conditions for a PBT. The example system shown in FIG. 6 includes a computer-readable medium 602, a network device-coupled PBT 604, network device 606-1 . . . 606-n (hereinafter referred to as "network devices 606"), and a proximity beacon positioning system 608. In the example system shown in FIG. 6, the network device-coupled PBT 604, the network devices 606, and the proximity beacon positioning system 608 are coupled to each other through the computer-readable medium 602.

In a specific implementation, the network device-coupled PBT 604 functions according to an applicable device for transmitting proximity beacon signals, such as the network device-coupled PBTs described in this paper. The network device-coupled PBT 604 can transmit proximity beacon signals in accordance with applicable lower power short range wireless communication protocol, such as Bluetooth® or ZigBee®. For example, the network device-coupled PBT 604 can transmit proximity beacon signals over a network including communication channels maintained, at least in part, according to an applicable low power short range wireless communication protocol.

In a specific implementation, the network devices 606 function according to applicable device for transmitting data to and from a backhaul of a network to a client, such as the network devices described in this paper. Depending upon implementation-specific or other considerations, the network devices 606 can transmit data to and from a backhaul of a network to a client either through a wired or a wireless connection. Further depending upon implementation-specific or other considerations, the network devices 606 can function to send and receive data used in determining a position of a network device-coupled PBT within a region the network devices 606 are located. For example, the network devices 606 can receive proximity beacon signal data and/or a proximity beacon signal used in generating a RSSI reporting message for the proximity beacon signal. Further in the example, the network devices 606 can send the RSSI reporting message to an applicable system for determining a position of a network device-coupled PBT that transmits the proximity beacon signal, such as the proximity beacon positioning systems described in this paper.

In a specific implementation, the network devices 606 receive proximity beacon signals directly from the network device-coupled PBT 604. Proximity beacon signals received by the network devices 606 from the network device-coupled PBT 604 can be used to determine a position of the network device-coupled PBT 604 within a region in which the network devices 606 are located. In sending proximity beacon signals directly to the network devices 606, the network device-coupled PBT 604 is coupled to the network devices.

In a specific implementation, the network devices 606 receive proximity beacon signals and/or proximity beacon signals data from an intermediary device, e.g. a PBT hub, coupled to the network devices 606 that receives proximity beacon signals from the network device-coupled PBT 604. Proximity beacon signals and/or proximity beacon signals data received by the network devices 606 can be used to determine a position of the network device-coupled PBT 604 within a region in which the network devices 606 are located. As the network devices 606 receive proximity beacon signals and/or proximity beacon signals data through an intermediary device receiving proximity beacon signals transmitted by the network device-coupled PBT 604, the network device-coupled PBT 604 is coupled to the network devices 606 through the intermediary device.

In a specific implementation, the proximity beacon positioning system 608 functions according to an applicable system for determining a location of a network device-coupled PBT within a region, such as the proximity beacon positioning systems described in this paper. The proximity beacon positioning system 608 can receive RSSI reporting messages from the network devices 606 based on proximity beacon signals transmitted by the network device-coupled PBT 604. The proximity beacon positioning system 608 can determine environment conditions of or associated with the network device-coupled PBT 604 using received RSSI reporting messages.

In the example system shown in FIG. 6, the proximity beacon positioning system 608 includes a RSSI reporting data receipt engine 610 and a proximity beacon environment determination engine 612. In a specific implementation, the RSSI reporting data receipt engine 610 functions according to an applicable system for receiving RSSI reporting messages, such as the RSSI reporting data receipt engines described in this paper. The RSSI reporting data receipt engine 610 can receive RSSI reporting messages from the network devices 606.

In a specific implementation, the proximity beacon environment determination engine 612 functions to determine environment conditions from received RSSI reporting messages. An environment condition determined by the proximity beacon environment determination engine 612 can include a temperature at a PBT and/or an indication that a device the PBT is placed on, or otherwise associated with, is turned on. The proximity beacon environment determination engine 612 can determine environment conditions from environment data included in RSSI reporting messages. Environment data included in RSSI reporting messages can be generate from environment data included in proximity beacon signals.

In an example of operation of the example system shown in FIG. 6, the network device-coupled PBT 604 transmits a proximity beacon signal to either the network devices 606 or a PBT hub coupled to the network devices 606. In the example of operation of the example system shown in FIG. 6, the network devices transmit RSSI reporting messages based on the proximity beacon signal to the proximity beacon positioning system 608. Further, in the example of operation of the example system shown in FIG. 6, the RSSI reporting data receipt engine 610 receives the RSSI reporting messages from the network devices 606. In the example of operation of the example system shown in FIG. 6, the proximity beacon environment determination engine 612 determines environment conditions for the network device-coupled PBT 604 from the RSSI reporting messages.

Figure 7:
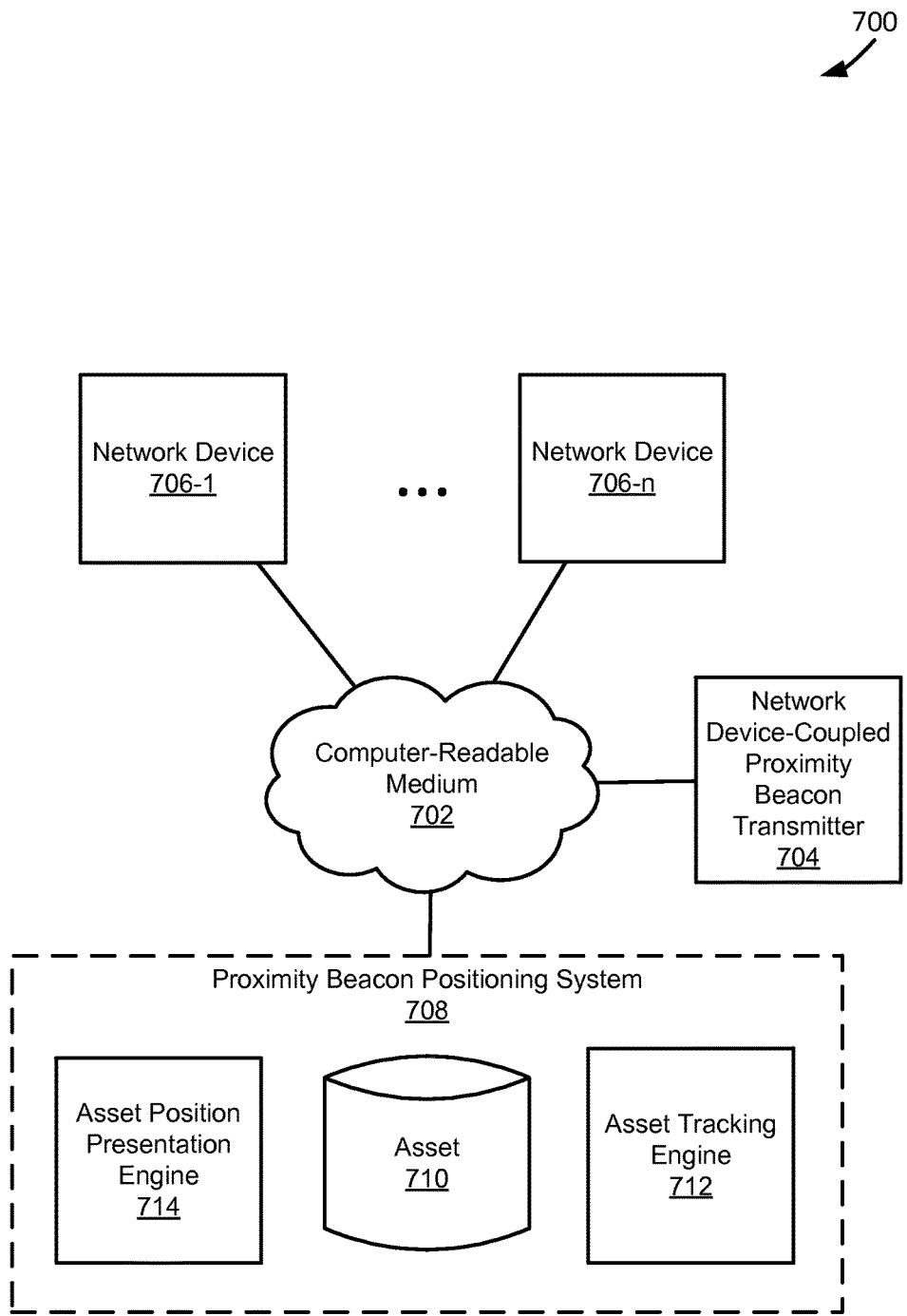
FIG. 7 depicts a diagram of an example of a system for tracking assets associated with a network device-coupled PBT based on a position of the network device-coupled PBT.

FIG. 7 depicts a diagram 700 of an example of a system for tracking assets associated with a network device-coupled PBT based on a position of the network device-coupled PBT. The example system shown in FIG. 7 includes a computer-readable medium 702, a network device-coupled PBT 704, network device 706-1 . . . 706-n (hereinafter referred to as "network devices 706"), and a proximity beacon positioning system 708. In the example system shown in FIG. 7, the network device-coupled PBT 704, the network devices 706, and the proximity beacon positioning system 708 are coupled to each other through the computer-readable medium 702.

In a specific implementation, the network device-coupled PBT 704 functions according to an applicable device for transmitting proximity beacon signals, such as the network device-coupled PBTs described in this paper. The network device-coupled PBT 704 can transmit proximity beacon signals in accordance with applicable lower power short range wireless communication protocol, such as Bluetooth® or ZigBee®. For example, the network device-coupled PBT 704 can transmit proximity beacon signals over a network including communication channels maintained, at least in part, according to an applicable low power short range wireless communication protocol.

In a specific implementation, the network devices 706 function according to applicable device for transmitting data to and from a backhaul of a network to a client, such as the network devices described in this paper. Depending upon implementation-specific or other considerations, the network devices 706 can transmit data to and from a backhaul of a network to a client either through a wired or a wireless connection. Further depending upon implementation-specific or other considerations, the network devices 706 can function to send and receive data used in determining a position of a network device-coupled PBT within a region the network devices 706 are located. For example, the network devices 706 can receive proximity beacon signal data and/or a proximity beacon signal used in generating a RSSI reporting message for the proximity beacon signal. Further in the example, the network devices 706 can send the RSSI reporting message to an applicable system for determining a position of a network device-coupled PBT that transmits the proximity beacon signal, such as the proximity beacon positioning systems described in this paper.

In a specific implementation, the network devices 706 receive proximity beacon signals directly from the network device-coupled PBT 704. Proximity beacon signals received by the network devices 706 from the network device-coupled PBT 704 can be used to determine a position of the network device-coupled PBT 704 within a region in which the network devices 706 are located. In sending proximity beacon signals directly to the network devices 706, the network device-coupled PBT 704 is coupled to the network devices.

In a specific implementation, the network devices 706 receive proximity beacon signals and/or proximity beacon signals data from an intermediary device, e.g. a PBT hub, coupled to the network devices 706 that receives proximity beacon signals from the network device-coupled PBT 704. Proximity beacon signals and/or proximity beacon signals data received by the network devices 706 can be used to determine a position of the network device-coupled PBT 704 within a region in which the network devices 706 are located. As the network devices 706 receive proximity beacon signals and/or proximity beacon signals data through an intermediary device receiving proximity beacon signals transmitted by the network device-coupled PBT 704, the network device-coupled PBT 704 is coupled to the network devices 606 through the intermediary device.

In a specific implementation, the proximity beacon positioning system 708 functions according to an applicable system for determining a location of a network device-coupled PBT within a region, such as the proximity beacon positioning systems described in this paper. Based on a position of a network device-coupled PBT within a region, the proximity beacon positioning system can track the position, within the region, of an asset associated with the network-coupled PBT. An asset, as used in this paper, can include a moveable object or being. For example, an asset can be a human being.

In the example system shown in FIG. 7, the proximity beacon positioning system 708 includes an asset datastore 710, an asset tracking engine 712, and an asset position presentation engine 714. In a specific implementation, the asset datastore 710 functions to store asset data for assets. Asset data for assets can include an identification of assets and PBTs associated with the assets. A PBT can be associated with an asset if it is used to determine a position of the asset. Depending upon implementation-specific or other considerations, a PBT is associated with an asset if it is affixed to the asset or near the asset, such that as the asset moves, so does the PBT. For example, a PBT can be associated with an asset that is a person if the person is carrying the PBT. The asset datastore 710 may or may not also include data gathered in the vicinity of the PBT, such as by a sensor. The sensor can take measurements of the asset using internal sensors or measurements of the environment using external sensors. External sensors can be used to detect changes in the environment as the asset is moved. (The internal sensors may also be used in this manner, though detecting changes in the environment might be indirect, such as by determining the environment is hotter when the internal temperature of an asset increases.) The measurements can be stored in the asset datastore 710 with or without preprocessing the values.

In a specific implementation, the asset tracking engine 712 functions to track a position of an asset within a region based on a position in the region of a PBT associated with the asset. In tracking an asset, the asset tracking engine 712 can determine an identification of an asset associated with a PBT from asset data stored in the asset datastore 710. Depending upon implementation-specific or other considerations, the asset tracking engine 712 can determine a position of an asset within a region based on a position of a network device-coupled PBT associated with the asset. Further depending upon implementation-specific or other considerations, the asset tracking engine 712 can determine a position of an asset within a region based on a position of a network device-coupled PBT associated with the asset relative to a network device within the region. The asset tracking engine 712 can determine the position of an asset as the asset moves or is moved, thereby tracking the asset.

In a specific implementation, the asset position presentation engine 714 functions to present a position of an asset within a region as the asset is being tracked. In presenting a location of an asset to a user, the asset position presentation engine 714 can send asset tracking presentation data to a user. Asset tracking presentation data can include data used to render a map of a region and a position indicator indicating location of an asset within the region. Depending upon implementation-specific or other considerations, asset tracking presentation data can include network device map data used in generating a display of a floor plan of the region for a user.

In an example of operation of the example system shown in FIG. 7, the asset tracking engine 712 tracks a position of an asset within a region based on a position of a network device-coupled PBT associated with the asset and asset data indicating the asset. In the example of operation of the example system shown in FIG. 7, the asset position presentation engine 714 sends data used in displaying a position of the asset within the region.

Figure 8:
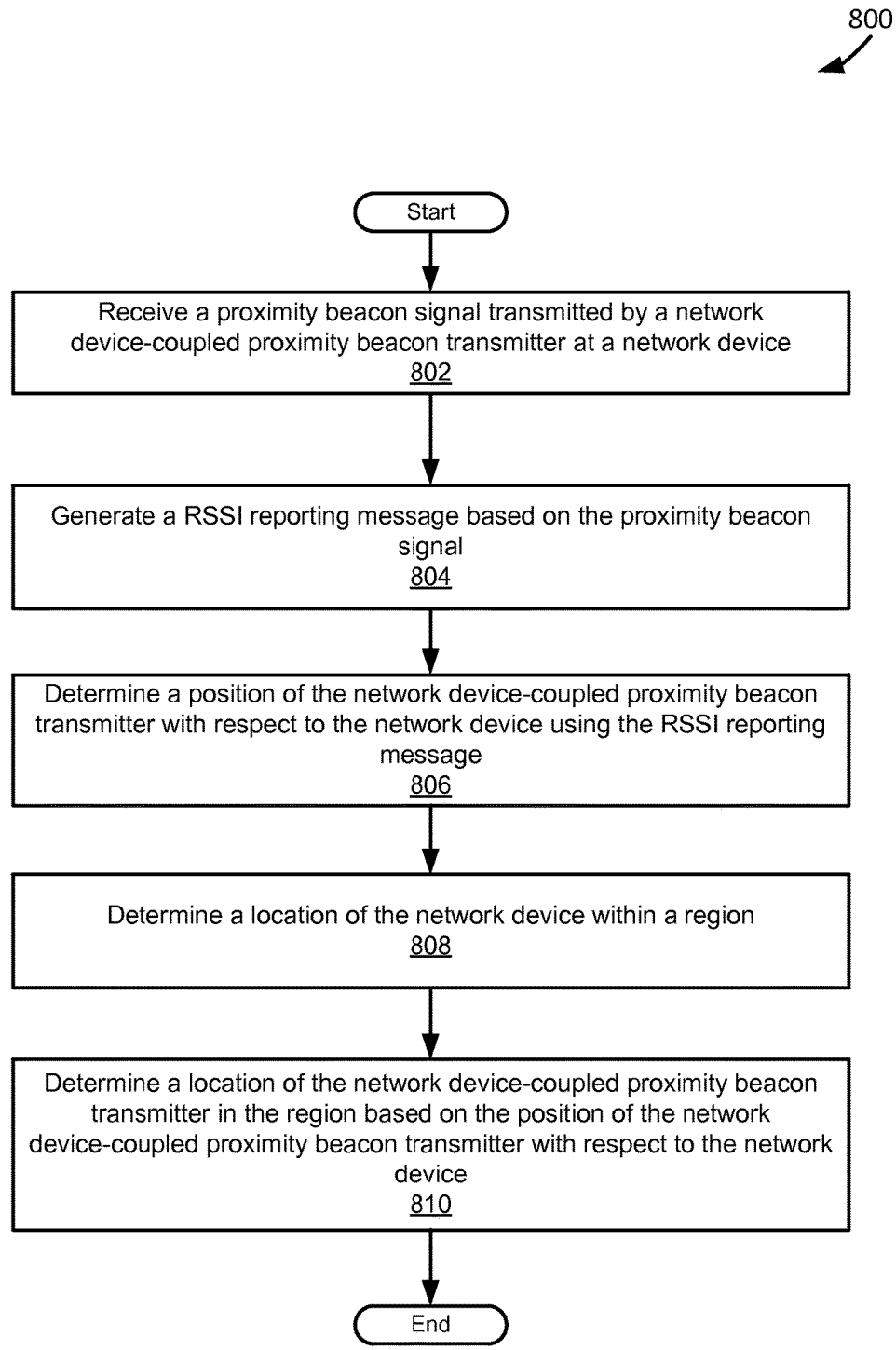
FIG. 8 depicts a flowchart of an example of a method for determining a location of a network device-coupled PBT within a region based on a position relative to a network device in the region.

FIG. 8 depicts a flowchart 800 of an example of a method for determining a location of a network device-coupled PBT within a region based on a position relative to a network device in the region. The flowchart 800 begins at module 802, where a proximity beacon signal transmitted by a network device-coupled PBT is received at a network device. A proximity beacon signal can be received at a network device through a wireless communication channel created and maintained in accordance with an applicable lower power short range wireless communication protocol, such as Bluetooth® or ZigBee®. A proximity beacon signal received at module 802 can include a uuid of a network device-coupled PBT sending the proximity beacon signal.

The flowchart 800 continues to module 804, where a RSSI reporting message is generated by the network device based on the proximity beacon signal. An RSSI reporting message can include a RSSI of the proximity beacon signal, as received at the network device. An RSSI reporting message can also include uuid of the network device-coupled PBT and a unique identification of the network device generating the RSSI reporting message.

The flowchart 800 continues to module 806, where a position of the network device-coupled PBT with respect to the network device is determined using the RSSI reporting message. In determining a position of the network device-coupled PBT, the network device can send the RSSI reporting message to a proximity beacon positioning system where it is received by an RSSI reporting data receipt engine of the proximity beacon positioning system. Depending upon implementation-specific or other considerations, a position of the network device-coupled PBT can be determined from a RSSI of the proximity beacon signal, as determined by a RSSI determination engine from the received RSSI reporting message. Further depending upon implementation-specific or other considerations, a position of the network device-coupled PBT with respect to the network device can be determined from a RSSI of the proximity beacon signal as received at the network device and a transmit power of the network device-coupled PBT, included as part of operational parameters data. For example, a RSSI of the proximity beacon signal as received at the network device can be compared to a transmit power to determine the amount of power the proximity beacon signal lost through wireless transmission, e.g. correlating to a distance away from the network device the network device-coupled PBT is positioned. Depending upon implementation-specific or other considerations, a position of the network device-coupled PBT with respect to the network device can be determined from a RSSI of the proximity beacon signal received at the network device and network device map data describing characteristics of obstructions within a region in which the network device-coupled PBT and the network device are located.

The flowchart 800 continues to module 808, where a location of the network device within a region is determined. A location of the network device within a region can be determined using the unique identification of the network device, included in the RSSI reporting message, and determined by a coupled network device identification determination engine. A location of the network device within a region can be determined by looking up position indicators of network devices in network device map data until a position indicator matching a unique identification of the network device is found.

The flowchart 800 continues to module 810 where a location of the network device-coupled PBT in the region is determined based on the position of the network device-coupled PBT with respect to the network device. Specifically, using the location of the network device within the region and the position of the network device-coupled PBT with respect to the network device, the location of the network device-coupled PBT within the region can be determined. For example, if the network device-coupled PBT is 10 feet away from a network device, and the network device is located in the center of a room, then it can be determined that the network device-coupled PBT is 10 feet away from the center of the room.

Figure 9:
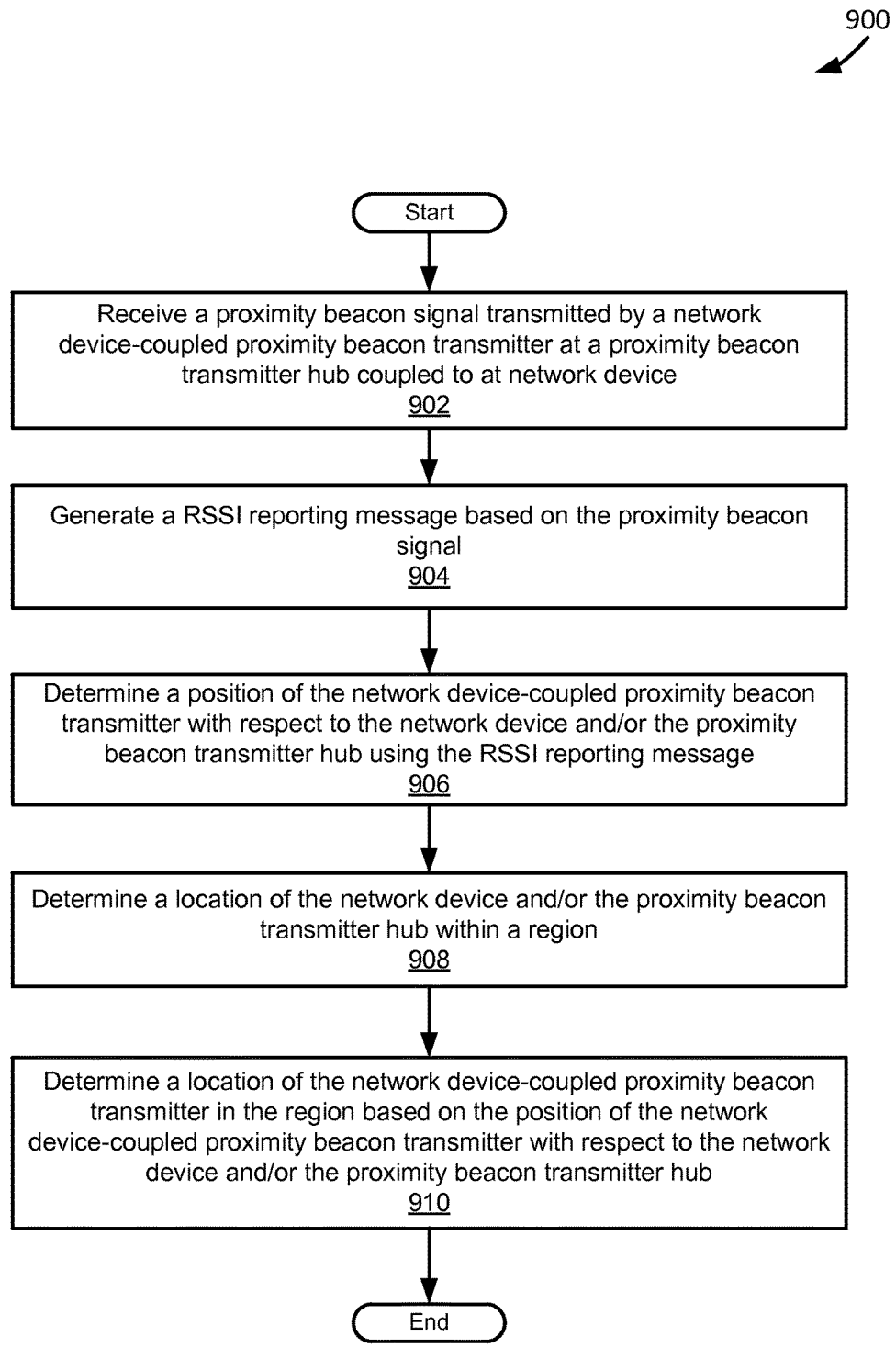
FIG. 9 depicts a flowchart of an example of a method for determining a location of a network device-coupled PBT within a region based on a position relative to a network device and/or a PBT hub in the region.

FIG. 9 depicts a flowchart 900 of an example of a method for determining a location of a network device-coupled PBT within a region based on a position relative to a network device and/or a PBT hub in the region. The flowchart 900 begins at module 902, where a proximity beacon signal transmitted by a network device-coupled PBT is received at a PBT hub coupled to a network device. A proximity beacon signal can be received at a PBT hub through a wireless communication channel created and maintained in accordance with an applicable lower power short range wireless communication protocol, such as Bluetooth® or ZigBee®. A proximity beacon signal received at module 902 can include a uuid of a network device-coupled PBT sending the proximity beacon signal.

The flowchart 900 continues to module 902, where a RSSI reporting message is generated by the network device based on the proximity beacon signal. An RSSI reporting message can include a RSSI of the proximity beacon signal, as received at the PBT hub. An RSSI reporting message can also include uuid of the network device-coupled PBT and a unique identification of the network device generating the RSSI reporting message and the PBT hub that received the proximity beacon signal. Depending upon implementation-specific or other considerations, the network device can generate the RSSI of the proximity beacon signal based on the proximity beacon signal as sent to the network device by the PBT hub and/or by proximity beacon signal data generated from the proximity beacon signal at the PBT hub and sent to the network device.

The flowchart 900 continues to module 906, where a position of the network device-coupled PBT with respect to the network device and/or the PBT hub is determined using the RSSI reporting message. In determining a position of the network device-coupled PBT, the network device can send the RSSI reporting message to a proximity beacon positioning system where it is received by an RSSI reporting data receipt engine of the proximity beacon positioning system. Depending upon implementation-specific or other considerations, a position of the network device-coupled PBT can be determined from a RSSI of the proximity beacon signal, as determined by a RSSI determination engine from the received RSSI reporting message. Further depending upon implementation-specific or other considerations, a position of the network device-coupled PBT with respect to the network device and/or the PBT hub can be determined from a RSSI of the proximity beacon signal as received at the PBT hub and a transmit power of the network device-coupled PBT, included as part of operational parameters data. For example, a RSSI of the proximity beacon signal as received at the PBT hub can be compared to a transmit power to determine the amount of power the proximity beacon signal lost through wireless transmission, e.g. correlating to a distance away from the network device and/or the PBT hub the network device-coupled PBT is positioned. Depending upon implementation-specific or other considerations, a position of the network device-coupled PBT with respect to the network device and/or PBT hub can be determined from a RSSI of the proximity beacon signal received at the PBT hub and network device map data describing characteristics of obstructions within a region in which the network device-coupled PBT, the network device, and the PBT hub are located.

The flowchart 900 continues to module 908, where a location of the network device and/or the PBT hub within a region is determined. A location of the network device and/or the PBT hub within a region can be determined using the unique identification of the network device, included in the RSSI reporting message, and determined by a coupled network device identification determination engine. A location of the network device and/or the PBT hub within a region can be determined by looking up position indicators of network devices and/or PBT hubs in network device map data until a position indicator matching a unique identification of the network device and/or the PBT hub is found.

The flowchart 900 continues to module 910 where a location of the network device-coupled PBT in the region is determined based on the position of the network device-coupled PBT with respect to the network device and/or the PBT hub. Specifically, using the location of the network device and/or the PBT hub within the region and the position of the network device-coupled PBT with respect to the network device and/or the PBT hub, the location of the network device-coupled PBT within the region can be determined. For example, if the network device-coupled PBT is 10 feet away from the network device and/or the PBT hub, and the network device and/or the PBT hub is located in the center of a room, then it can be determined that the network device-coupled PBT is 10 feet away from the center of the room.

Figure 10:
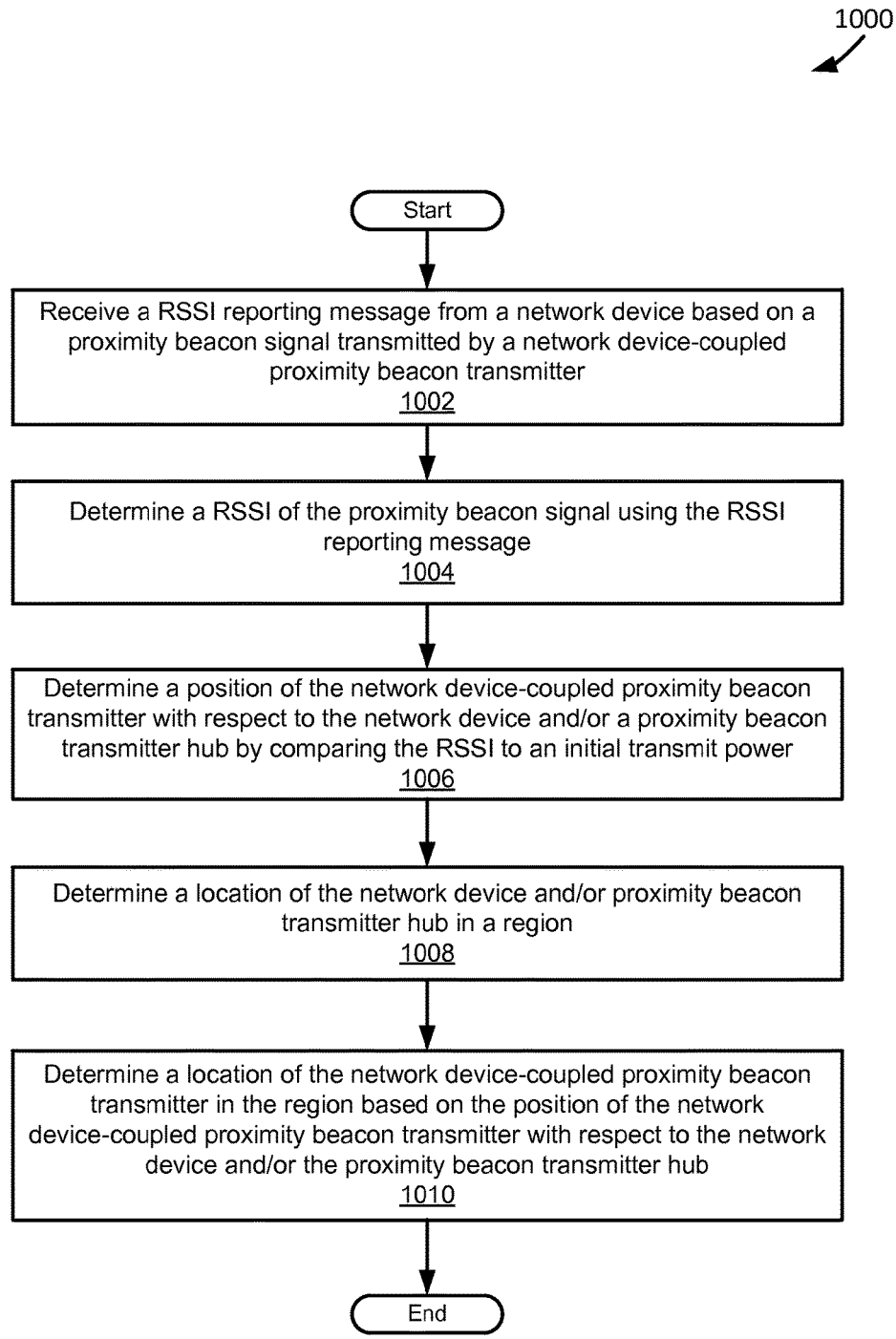
FIG. 10 depicts a flowchart of an example of a method for determining a location of a network device-coupled PBT based on a RSSI of the proximity beacon signal as received at a network device.

FIG. 10 depicts a flowchart 1000 of an example of a method for determining a location of a network device-coupled PBT based on a RSSI of the proximity beacon signal as received at a network device. The flowchart 1000 begins at module 1002, where a RSSI reporting message, based on a proximity beacon signal transmitted by a network device-coupled PBT, is received from the network device. A RSSI reporting message can include a RSSI of a proximity beacon signal as received. Depending upon implementation-specific or other considerations, a RSSI reporting message can include a unique identification of a network device, a unique identification of a PBT hub, and a uuid of a network device-coupled PBT.

The flowchart 1000 continues to module 1004, where a RSSI of the proximity beacon signal, as received, is determined using the RSSI reporting message. The RSSI of the proximity beacon signal, as received, can be determined from the RSSI reporting message by a RSSI determination engine. Depending upon implementation-specific or other considerations, a RSSI of the proximity beacon signal can be for the proximity beacon signal as it is received at the network device, or at a PBT hub.

The flowchart 1000 continues to module 1006, where a position of the network device-coupled PBT with respect to the network device and/or a PBT hub is determined based on the determined RSSI of the proximity beacon signal. In determining the position of the network device-coupled PBT with respect to the network device and/or a PBT hub, the determined RSSI is compared, by a proximity beacon location determination engine, to a transmit power of the proximity beacon signal. For example, the RSSI of the proximity beacon signal, as received, can be compared to a transmit power to determine the amount of power the proximity beacon signal lost through wireless transmission, e.g. correlating to a distance away from the network device and/or the PBT hub the network device-coupled PBT is positioned.

The flowchart 1000 continues to module 1008, where a location of the network device and/or the PBT hub within a region is determined. A location of the network device and/or the PBT hub within a region can be determined using the unique identification of the network device, included in the RSSI reporting message, and determined by a coupled network device identification determination engine. A location of the network device and/or the PBT hub within a region can be determined by looking up position indicators of network devices and/or PBT hubs in network device map data until a position indicator matching a unique identification of the network device and/or the PBT hub is found.

The flowchart 1000 continues to module 1010 where a location of the network device-coupled PBT in the region is determined based on the position of the network device-coupled PBT with respect to the network device and/or the PBT hub. Specifically, using the location of the network device and/or the PBT hub within the region and the position of the network device-coupled PBT with respect to the network device and/or the PBT hub, the location of the network device-coupled PBT within the region can be determined. For example, if the network device-coupled PBT is 10 feet away from the network device and/or the PBT hub, and the network device and/or the PBT hub is located in the center of a room, then it can be determined that the network device-coupled PBT is 10 feet away from the center of the room.

Figure 11:
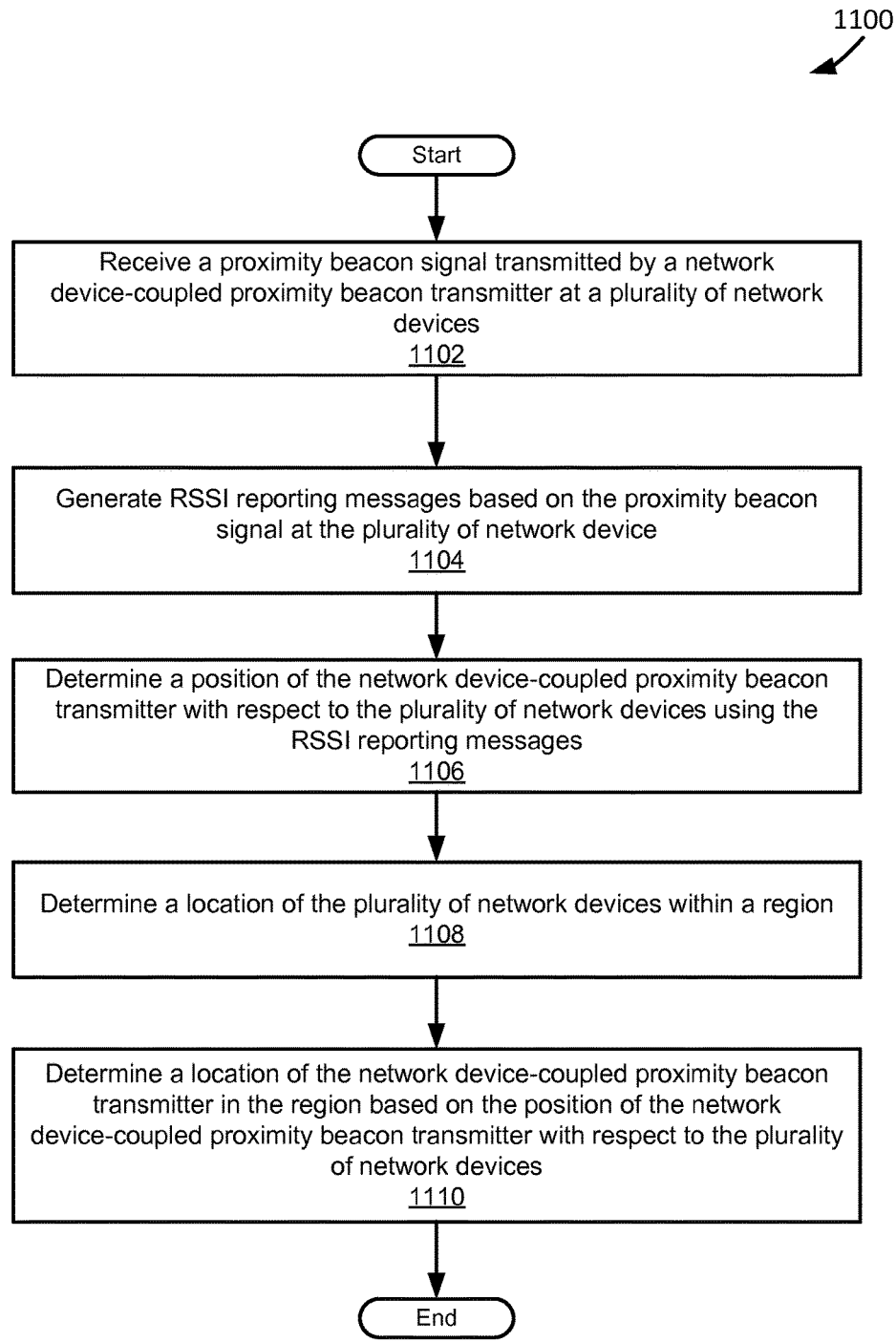
FIG. 11 depicts a flowchart of an example of a method for determining a location of a network device-coupled PBT within a region based on a position relative to a plurality of network devices in the region.

FIG. 11 depicts a flowchart 1100 of an example of a method for determining a location of a network device-coupled PBT within a region based on a position relative to a plurality of network devices in the region. The flowchart 1100 begins at module 1102, where a proximity beacon signal transmitted by a network device-coupled PBT is received at a plurality of network devices. A proximity beacon signal can be received at a plurality of network devices through a wireless communication channel created and maintained in accordance with an applicable lower power short range wireless communication protocol, such as Bluetooth® or ZigBee®. A proximity beacon signal received at module 1102 can include a uuid of a network device-coupled PBT sending the proximity beacon signal.

The flowchart 1100 continues to module 1104, where RSSI reporting messages are generated by the plurality of network devices based on the proximity beacon signal. Depending upon implementation-specific or other considerations, each network device of the plurality of network device can generate a RSSI reporting message of RSSI reporting messages. An RSSI reporting message can include a RSSI of the proximity beacon signal, as received at each network device of the plurality of network devices. An RSSI reporting message can also include uuid of the network device-coupled PBT and a unique identification of the network device of the plurality of network devices generating the RSSI reporting message.

The flowchart 1100 continues to module 1106, where a position of the network device-coupled PBT with respect to the plurality of network devices is determined using the RSSI reporting messages. In determining a position of the network device-coupled PBT, the plurality of network devices can send the RSSI reporting message to a proximity beacon positioning system where it is received by an RSSI reporting data receipt engine of the proximity beacon positioning system. Depending upon implementation-specific or other considerations, a position of the network device-coupled PBT can be determined from RSSIs of the proximity beacon signal, as determined by a RSSI determination engine from the received RSSI reporting messages. Further depending upon implementation-specific or other considerations, a position of the network device-coupled PBT with respect to the plurality of network devices can be determined from RSSIs of the proximity beacon signal as received at the plurality of network devices and a transmit power of the network device-coupled PBT, included as part of operational parameters data. For example, RSSIs of the proximity beacon signal as received at the plurality of network devices can be compared to a transmit power to determine the amount of power the proximity beacon signal lost through wireless transmission, e.g. correlating to a distance away from the plurality of network devices the network device-coupled PBT is positioned. Depending upon implementation-specific or other considerations, a position of the network device-coupled PBT with respect to the plurality of network devices can be determined from RSSIs of the proximity beacon signal received at the plurality of network devices and network device map data describing characteristics of obstructions within a region in which the network device-coupled PBT and the plurality of network devices are located.

The flowchart 1100 continues to module 1108, where a location of the plurality of network devices within a region is determined. A location of the plurality of network devices within a region can be determined using unique identifications of the plurality of network devices, included in the RSSI reporting messages, and determined by a coupled network device identification determination engine. A location of the plurality of network devices within a region can be determined by looking up position indicators of network devices in network device map data until position indicators matching unique identifications of the plurality of the network device are found.

The flowchart 1100 continues to module 1110 where a location of the network device-coupled PBT in the region is determined based on the position of the network device-coupled PBT with respect to the plurality of network devices. Specifically, using the location of the plurality of network devices within the region and the position of the network device-coupled PBT with respect to the plurality of network devices, the location of the network device-coupled PBT within the region can be determined. For example, the location of the network device-coupled PBT can be triangulated based on the position of the network device-coupled PBT with respect to the plurality of network devices and the position of the plurality of network devices within the region.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:

receiving a proximity beacon signal from a network device-coupled proximity beacon transmitter located on a floor of a building at a proximity beacon transmitter hub coupled through a wired connection to a first network device configured to transmit data to and from a backhaul of a network for a client device in providing the client device access to network services, wherein the proximity beacon signal is transmitted in accordance with an applicable lower power short range wireless communication unsuitable for use in transmitting data from the backhaul of the network to the network device-coupled proximity beacon transmitter;

upon receiving the proximity beacon signal, generating and sending proximity beacon signal data from the proximity beacon transmitter hub, the proximity beacon signal data including a received signal strength indication (RSSI) value of the proximity beacon signal, an identification of the network device-coupled proximity beacon transmitter, and an identification of the proximity beacon transmitter hub;

maintaining, separate from the network device-coupled proximity beacon transmitter, proximity beacon transmitter operational parameters of the network device-coupled proximity beacon transmitter including a transmit power at which the network device-coupled proximity beacon transmitter is configured to transmit proximity beacon signals;

receiving the proximity beacon signal data at the first network device, and upon receiving the proximity beacon signal data, generating at and sending from the first network device a first RSSI reporting message including the RSSI value of the proximity beacon signal received from the network device-coupled proximity beacon transmitter over the applicable lower power short range wireless communication based on the proximity beacon signal data;

determining a position of the network device-coupled proximity beacon transmitter on the floor of the building with respect to the proximity beacon transmitter hub using the first RSSI reporting message by comparing the transmit power at which the network device-coupled proximity beacon transmitter is configured to transmit proximity beacon signals with the RSSI value of the proximity beacon signal received from the network device-coupled proximity beacon transmitter over the applicable lower power short range wireless communication, and using dimensions and characteristics of interior walls on the floor of the building;

determining a location of the proximity beacon transmitter hub using the first RSSI reporting message and network device map data for one or more floors of the building;

mapping a location, on the floor of the building, of the network device-coupled proximity beacon transmitter based on the position of the network device-coupled proximity beacon transmitter with respect to the proximity beacon transmitter hub and the location of the proximity beacon transmitter hub on the floor of the building indicated by the network device map data.

2. The method of claim 1, further comprising:

receiving the proximity beacon signal at second and third network devices located on the floor of the building, and upon receiving the proximity beacon signal, generating at and sending from the second and third network devices, corresponding second and third RSSI reporting messages based on the proximity beacon signal, respectively;

determining a position of the network device-coupled proximity beacon transmitter on the floor of the building with respect to the second network device using the second RSSI reporting message and the dimensions and characteristics of the interior walls on the floor of the building;

determining a location of the second network device using the second RSSI reporting message and the network device map data;

determining a position of the network device-coupled proximity beacon transmitter on the floor of the building with respect to the third network device using the third RSSI reporting message and the dimensions and characteristics of the interior walls on the floor of the building;

determining a location of the third network device using the third RSSI reporting message and the network device map data, wherein the location, on the floor of the building, of the network device-coupled proximity beacon transmitter is mapped also based on the positions of the network device-coupled proximity beacon transmitter with respect to the second network device and the third network device and the locations of the second network device and the third network device.

3. The method of claim 1, further comprising:
determining the identification of the proximity beacon transmitter hub;
matching the identification of the proximity beacon transmitter hub with one of multiple position indicator coordinates, included as part of the network device map data, of network devices within the building, for determining the location of the proximity beacon transmitter hub.

4. The method of claim 1, further comprising:
determining environment conditions of an environment surrounding the network device-coupled proximity beacon transmitter from the proximity beacon signal data, the environment conditions of the environment surrounding the network device-coupled proximity beacon transmitter obtained from at least one sensor coupled to the network device-coupled proximity beacon transmitter;
adding environment data indicating the environment conditions of the network device-coupled proximity beacon transmitter to the first RSSI reporting message;
determining the environment conditions of the network device-coupled proximity beacon transmitter from the environment data included as part of the first RSSI reporting message.

5. The method of claim 1, wherein the first RSSI reporting message includes the identification of the proximity beacon transmitter hub and the RSSI value of the proximity beacon signal.

6. The method of claim 1, further comprising:
determining an asset associated with the network device-coupled proximity beacon transmitter;
tracking a position of the asset on the floor of the building based on the location of the network device-coupled proximity beacon transmitter on the floor of the building.

7. The method of claim 1, further comprising:
determining a temperature condition at a position on the floor of the building surrounding the network device-coupled proximity beacon transmitter using at least one sensor coupled to the network device-coupled proximity beacon transmitter;
adding temperature data indicating the temperature condition around the network device-coupled proximity beacon transmitter to the first RSSI reporting message;
determining the temperature condition around the network device-coupled proximity beacon transmitter from the temperature data included as part of the first RSSI reporting message.

8. A system comprising:
a proximity beacon transmitter hub configured to:
receive a proximity beacon signal from a network device-coupled proximity beacon transmitter located on a floor of a building, wherein the proximity beacon signal is transmitted in accordance with an applicable lower power short range wireless communication unsuitable for use in transmitting data from a backhaul of a network to the network device-coupled proximity beacon transmitter;
generate and send proximity beacon signal data including a received signal strength indication (RSSI) value of the proximity beacon signal, an identification of the network device-coupled proximity beacon transmitter, and an identification of the proximity beacon transmitter hub;
a first network device configured to:
transmit data to and from the backhaul of the network for a client device in providing the client device access to network services;
receive, through the proximity beacon transmitter hub coupled to the first network device through a wired connection, the proximity beacon signal data;
generate and send a first RSSI reporting message including the RSSI value of the proximity beacon signal received from the network device-coupled proximity beacon transmitter over the applicable lower power short range wireless communication based on the proximity beacon signal data;
a proximity beacon transmitter parameters determination engine configured to maintain, separate from the network device-coupled proximity beacon transmitter, proximity beacon transmitter operational parameters of the network device-coupled proximity beacon transmitter including a transmit power at which the network device-coupled proximity beacon transmitter is configured to transmit proximity beacon signals;
a proximity beacon location determination engine configured to:
determine a position of the network device-coupled proximity beacon transmitter on the floor of the building with respect to the proximity beacon transmitter hub using the first RSSI reporting message by comparing the transmit power at which the network device-coupled proximity beacon transmitter is configured to transmit proximity beacon signals with the RSSI value of the proximity beacon signal received from the network device-coupled proximity beacon transmitter over the applicable lower power short range wireless communication, and using dimensions and characteristics of interior walls on the floor of the building;
determine a location of the proximity beacon transmitter hub using the first RSSI reporting message and network device map data for one or more floors of the building;
map a location, on the floor of the building, of the network device-coupled proximity beacon transmitter based on the position of the network device-coupled proximity beacon transmitter with respect to the proximity beacon transmitter hub and the location of the proximity beacon transmitter hub on the floor of the building indicated by the network device map data.

9. The system of claim 8, further comprising:
a second network device configured to:
receive the proximity beacon signal transmitted by the network device-coupled proximity beacon transmitter;
generate a second RSSI reporting message based on the proximity beacon signal;
a third network device configured to:
receive the proximity beacon signal transmitted by the network device-coupled proximity beacon transmitter;
generate a third RSSI reporting message based on the proximity beacon signal;
wherein the proximity beacon location determination engine is further configured to:
determine a position of the network device-coupled proximity beacon transmitter on the floor of the building with respect to the second network device using the second RSSI reporting message and the dimensions and characteristics of the interior walls on the floor of the building;
determine a location of the second network device using the second RSSI reporting message and the network device map data;
determine a position of the network device-coupled proximity beacon transmitter on the floor of the building with respect to the third network device using the third RSSI reporting message and the dimensions and characteristics of the interior walls on the floor of the building;
determine a location of the third network device using the third RSSI reporting message and the network device map data;
map the location, on the floor of the building, of the network device-coupled proximity beacon transmitter also based on the positions of the network device-coupled proximity beacon transmitter with respect to the second network device and the third network device and the locations of the second network device and the third network device.

10. The system of claim 8, further comprising:
a coupled network device identification determination engine configured to determine the identification of the proximity beacon transmitter hub;
wherein the proximity based location determination engine is configured to determine the location of the proximity beacon transmitter hub by matching the identification of the proximity beacon transmitter hub with one of multiple position indicator coordinates, included as part of the network device map data of network devices within the building.

11. The system of claim 8, wherein
the first network device is further configured to:
determine environment conditions of an environment surrounding the network device-coupled proximity beacon transmitter from the proximity beacon signal data, the environment conditions of the environment surrounding the network device-coupled proximity beacon transmitter obtained from at least one sensor coupled to the network device-coupled proximity beacon transmitter;
add environment data indicating the environment conditions of the network device-coupled proximity beacon transmitter to the first RSSI reporting message, the system further comprising:
a proximity beacon environment determination engine configured to determine the environment conditions of the network device-coupled proximity beacon transmitter from the environment data included as part of the first RSSI reporting message.

12. The system of claim 8, wherein the first RSSI reporting message includes the identification of the proximity beacon transmitter hub and the RSSI value of the proximity beacon signal.

13. The system of claim 8, further comprising an asset tracking engine configured to:
determine an asset associated with the network device-coupled proximity beacon transmitter;
track a position of the asset on the floor of the building based on the location of the network device-coupled proximity beacon transmitter on the floor of the building.

14. The system of claim 8, wherein
the first network device is further configured to:
determine a temperature condition at a position on the floor of the building surrounding the network device-coupled proximity beacon transmitter using at least one sensor coupled to the network device-coupled proximity beacon transmitter;
add temperature data indicating the temperature condition around the network device-coupled proximity beacon transmitter to the first RSSI reporting message, the system further comprising:
a proximity beacon environment determination engine configured to determine the temperature condition around the network device-coupled proximity beacon transmitter from the temperature data included as part of the first RSSI reporting message.

15. A system comprising:
means for receiving a proximity beacon signal from a network device-coupled proximity beacon transmitter located on a floor of a building at a proximity beacon transmitter hub coupled through a wired connection to a first network device configured to transmit data to and from a backhaul of a network for a client device in providing the client device access to network services, wherein the proximity beacon signal is transmitted in accordance with an applicable lower power short range wireless communication unsuitable for use in transmitting data from the backhaul of the network to the network device-coupled proximity beacon transmitter;
means for generating and sending proximity beacon signal data from the proximity beacon transmitter hub, the proximity beacon signal data including a received signal strength indication (RSSI) value of the proximity beacon signal, an identification of the network device-coupled proximity beacon transmitter, and an identification of the proximity beacon transmitter hub, upon receiving the proximity beacon signal;
means for maintaining, separate from the network device-coupled proximity beacon transmitter, proximity beacon transmitter operational parameters of the network device-coupled proximity beacon transmitter including a transmit power at which the network device-coupled proximity beacon transmitter is configured to transmit proximity beacon signals;
means for receiving the proximity beacon signal data at the first network device;
means for generating at and sending from the first network device a first RSSI reporting message including the RSSI value of the proximity beacon signal received from the network device-coupled proximity beacon transmitter over the applicable lower power short range wireless communication based on the proximity beacon signal data;
means for determining a position of the network device-coupled proximity beacon transmitter on the floor of the building with respect to the proximity beacon transmitter hub using the first RSSI reporting message by comparing the transmit power at which the network device-coupled proximity beacon transmitter is configured to transmit proximity beacon signals with the RSSI of the proximity beacon signal received from the network device-coupled proximity beacon transmitter over the applicable lower power short range wireless communication, and using dimensions and characteristics of interior walls on the floor of the building;
means for determining a location of the proximity beacon transmitter hub using the first RSSI reporting message and network device map data for one or more floors of the building;
means for mapping a location, on the floor of the building, of the network device-coupled proximity beacon transmitter based on the position of the network device-coupled proximity beacon transmitter with respect to the proximity beacon transmitter hub and the location of the proximity beacon transmitter hub on the floor of the building indicated by the network device map data.

* * * * *